Oct. 1, 1957   J. F. HALSTEAD   2,808,058
METHOD OF ALIGNING TOBACCO LEAVES ON A FEED
CONVEYOR AND THE FILLER FEED IN A
CIGAR BUNCH MACHINE
Original Filed Aug. 31, 1944   12 Sheets-Sheet 1

INVENTOR
JOHN F. HALSTEAD
BY
Bradley Cohn
ATTORNEY

Oct. 1, 1957

J. F. HALSTEAD 2,808,058

METHOD OF ALIGNING TOBACCO LEAVES ON A FEED
CONVEYOR AND THE FILLER FEED IN A
CIGAR BUNCH MACHINE

Original Filed Aug. 31, 1944

INVENTOR
JOHN F. HALSTEAD
BY Georges Washing
ATTORNEY

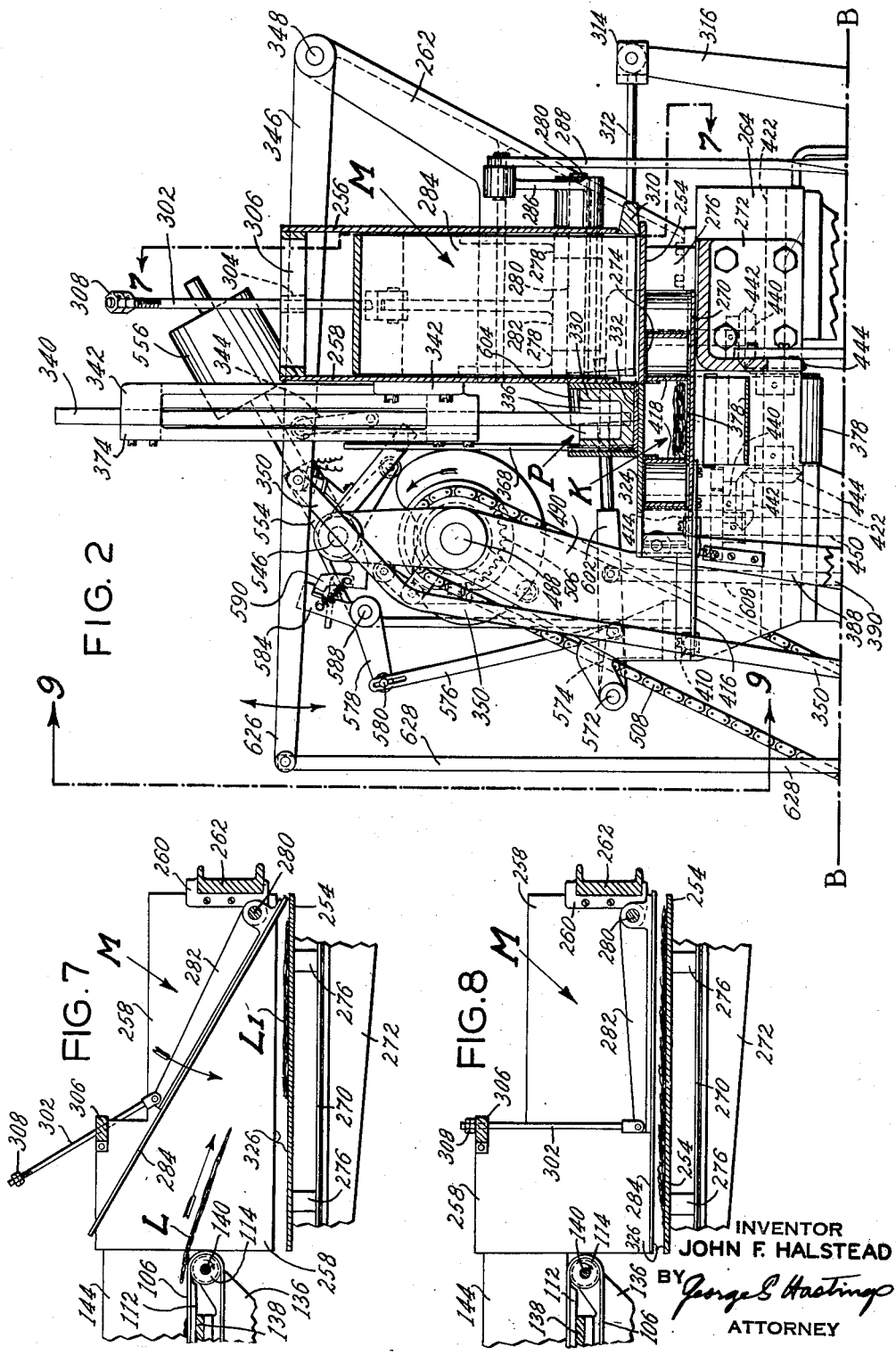

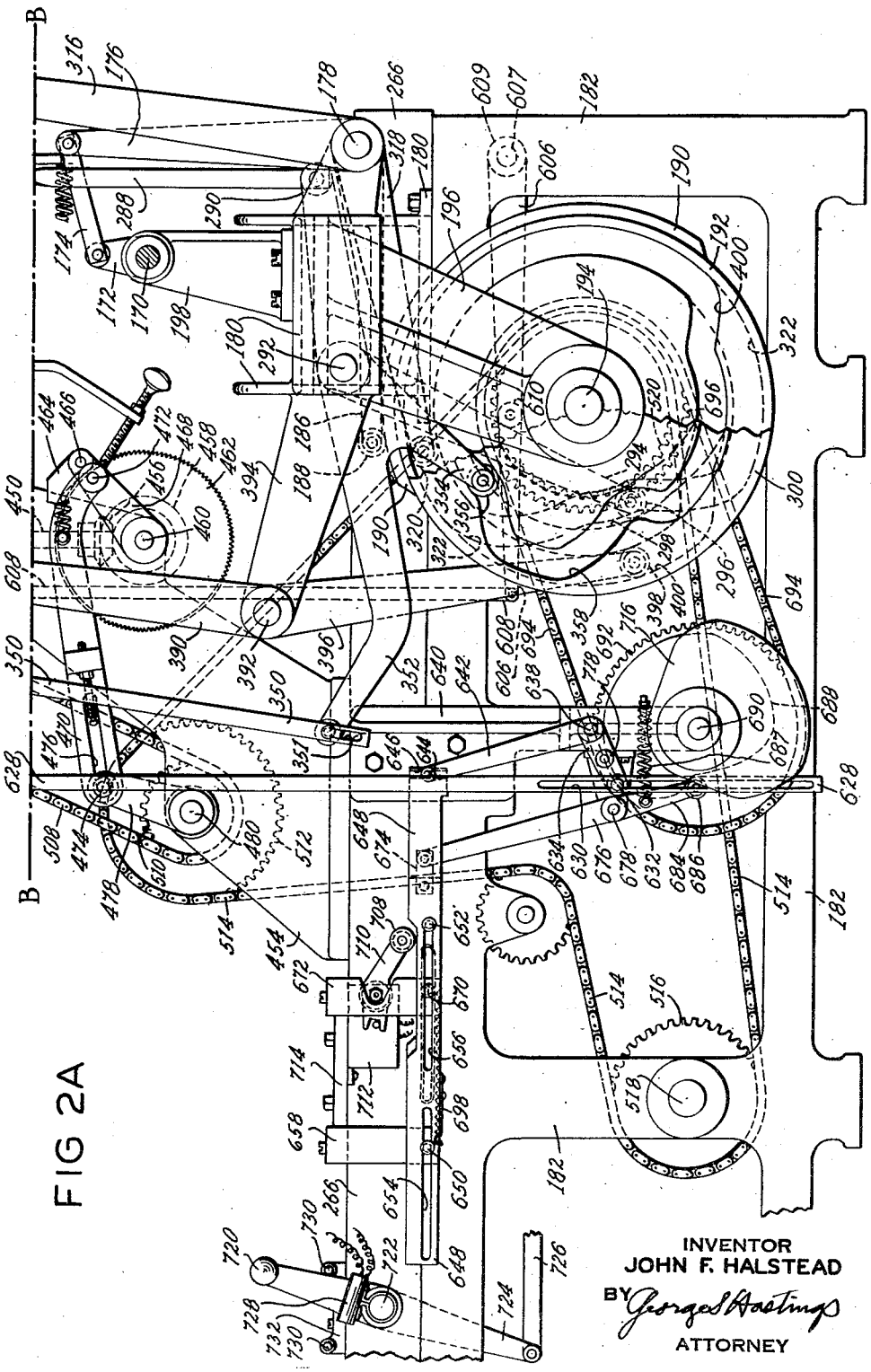

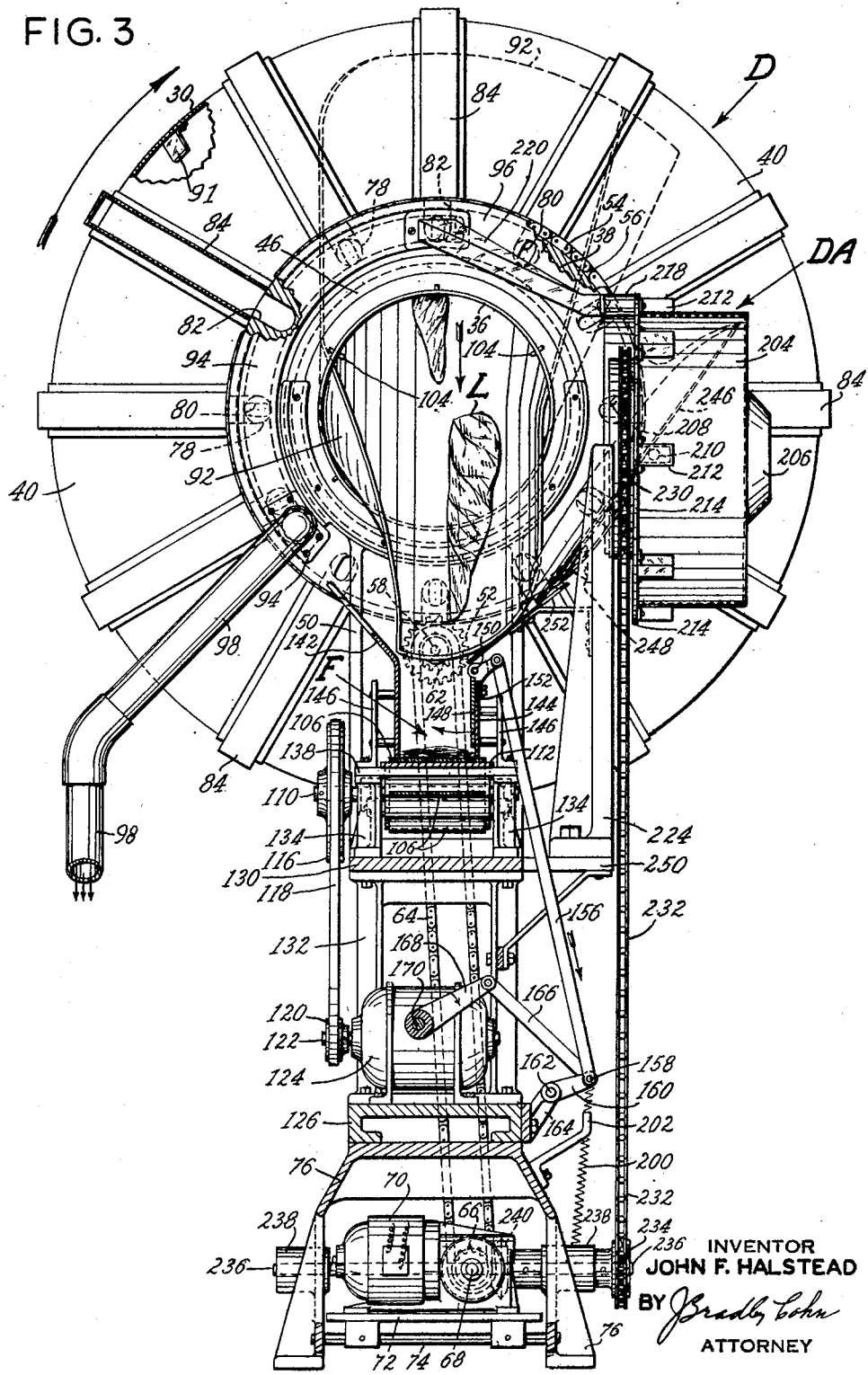

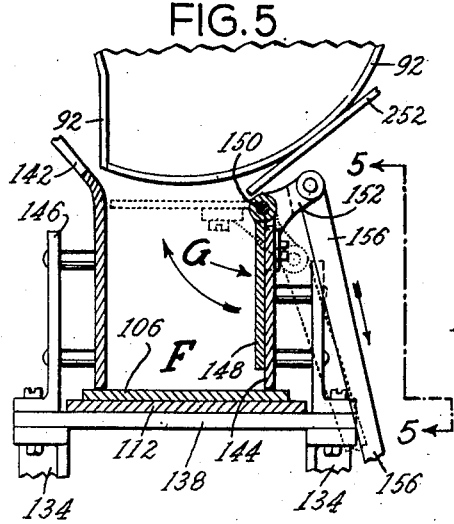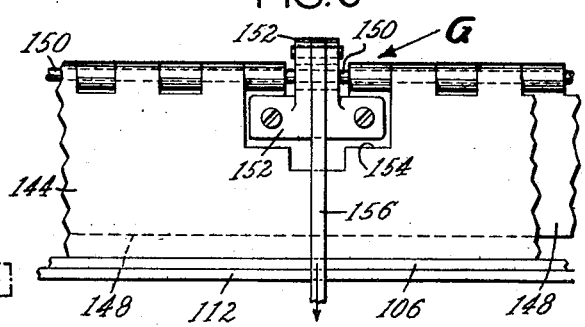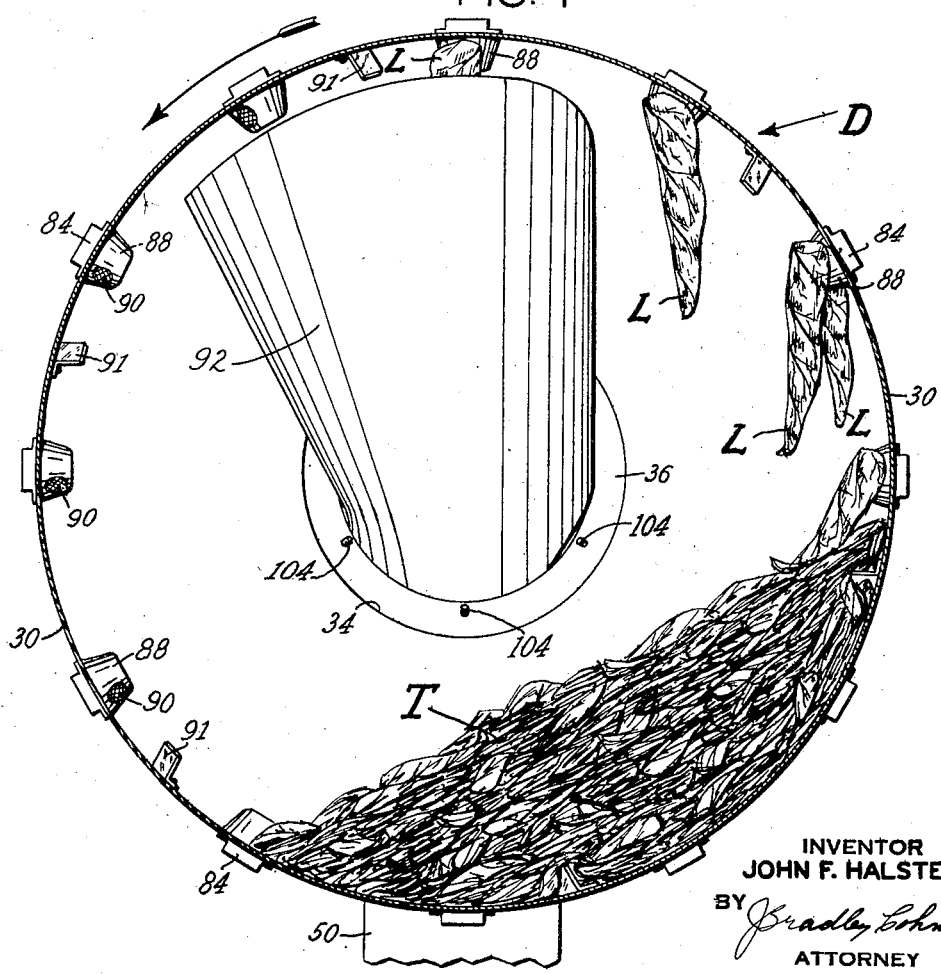

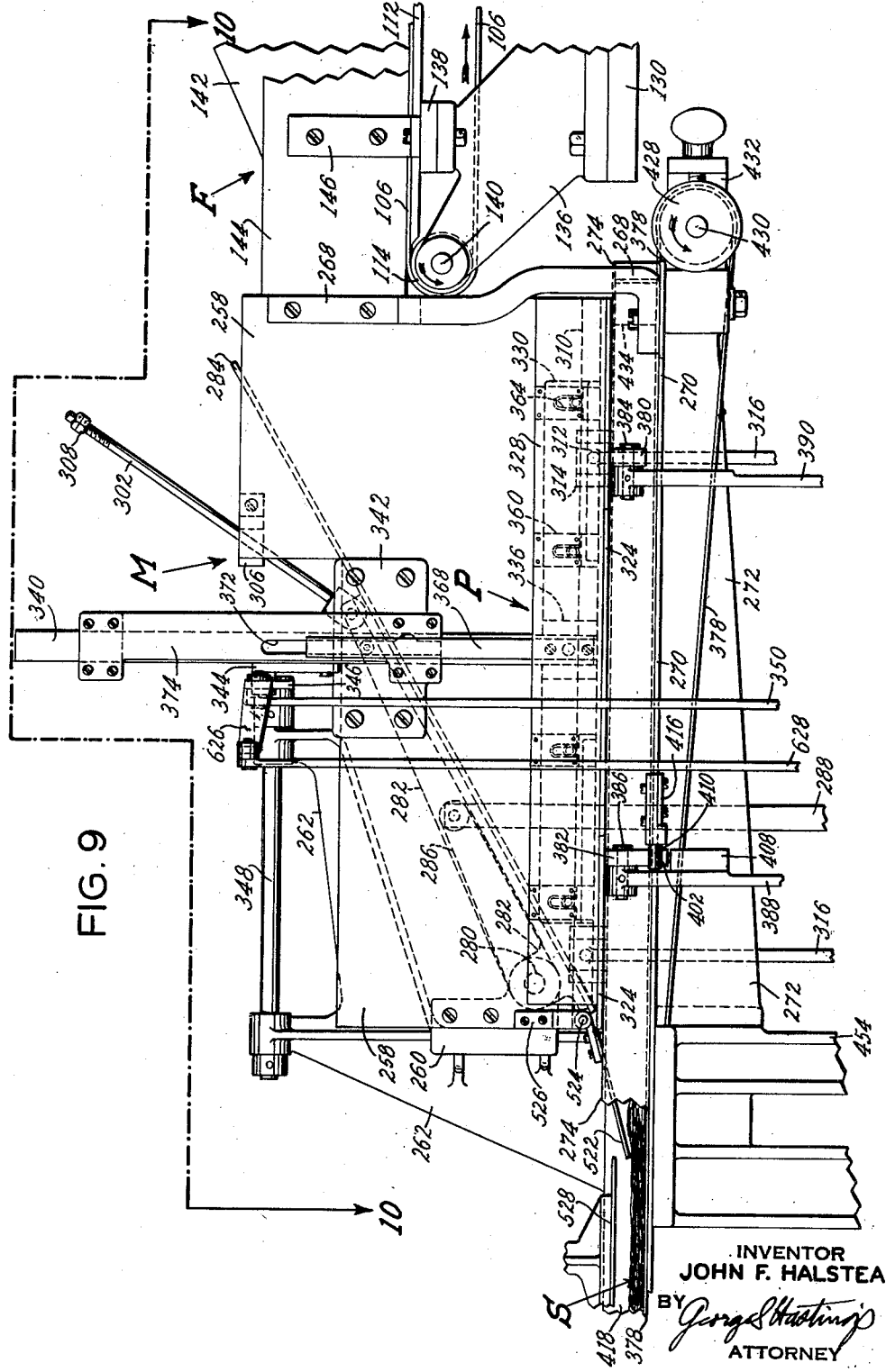

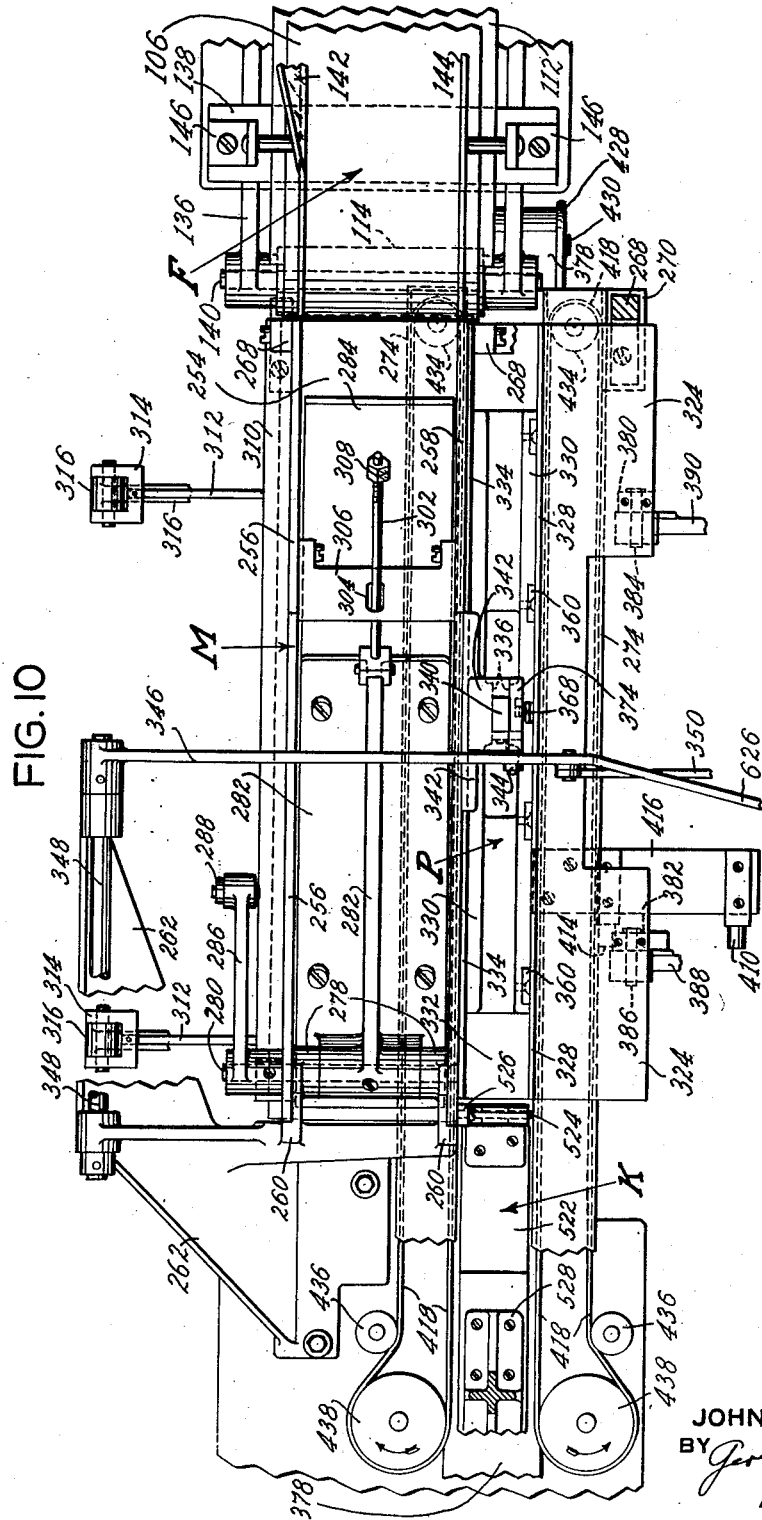

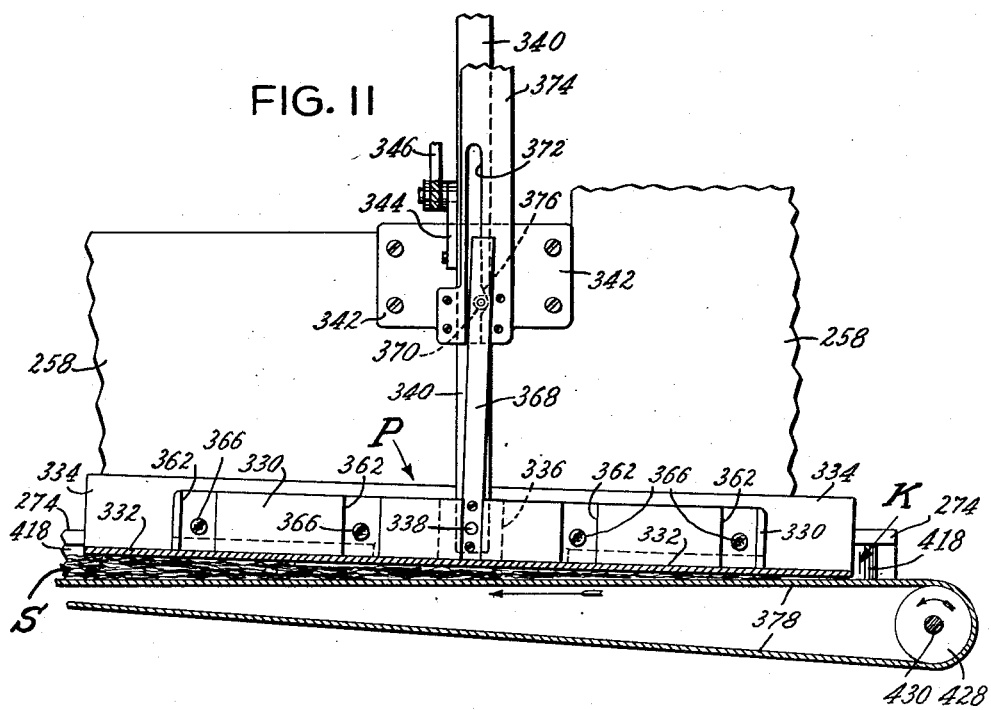
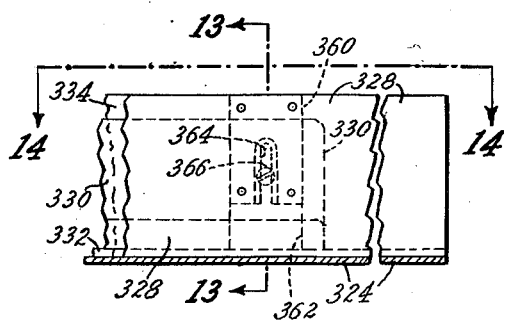
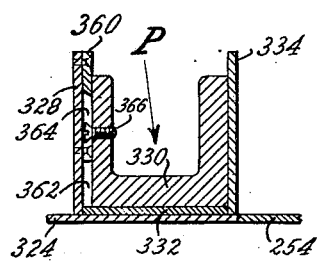
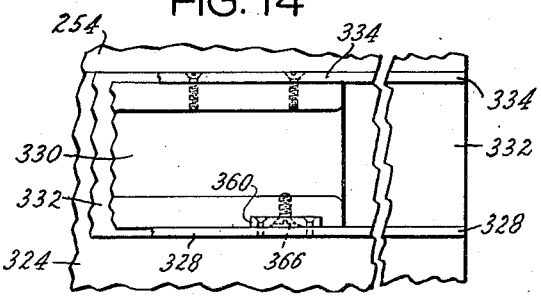

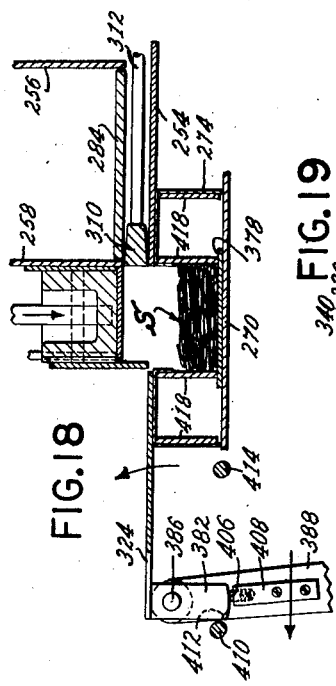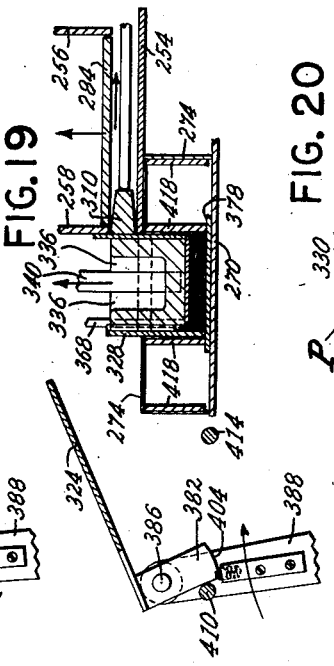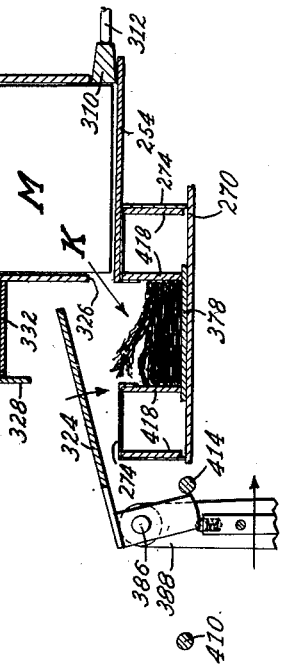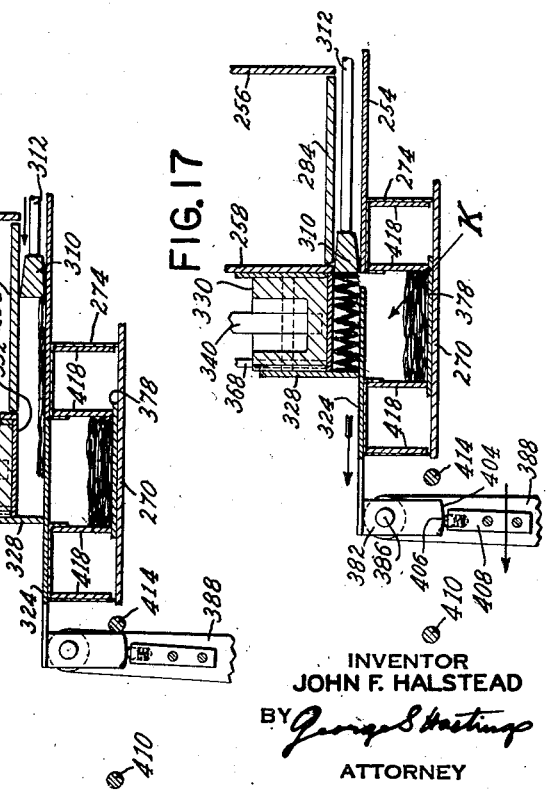

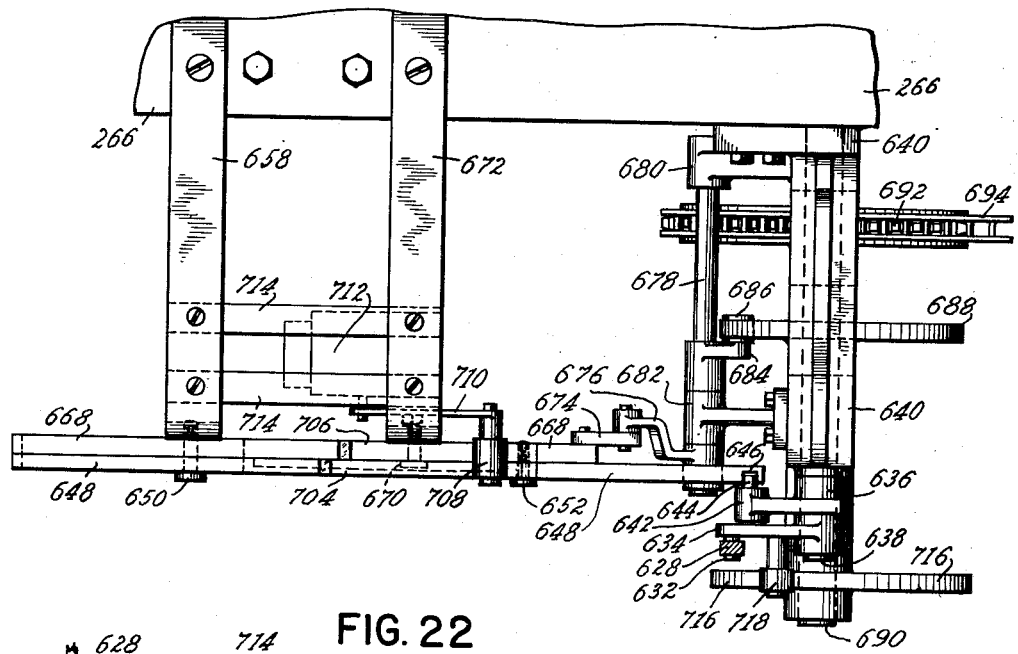
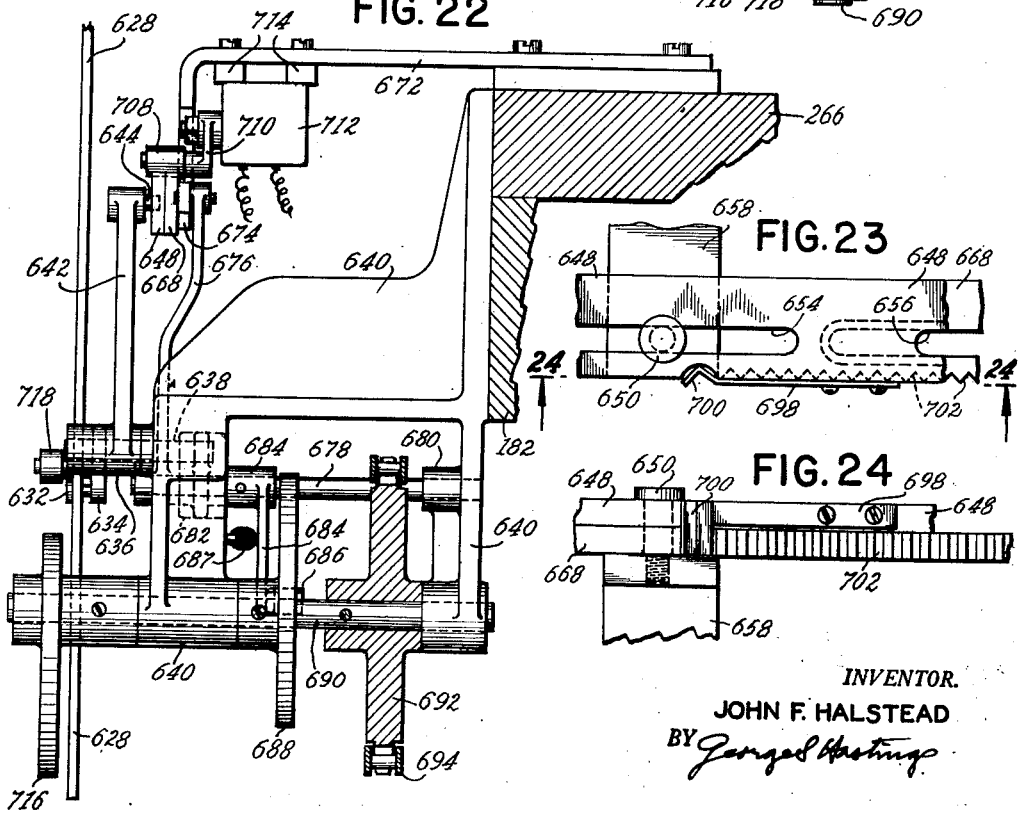

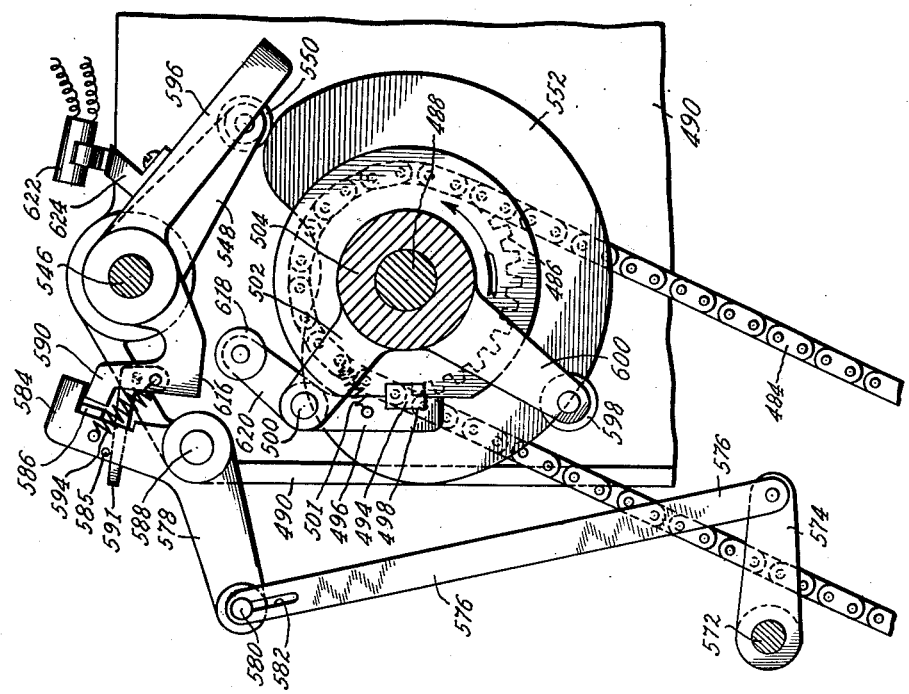
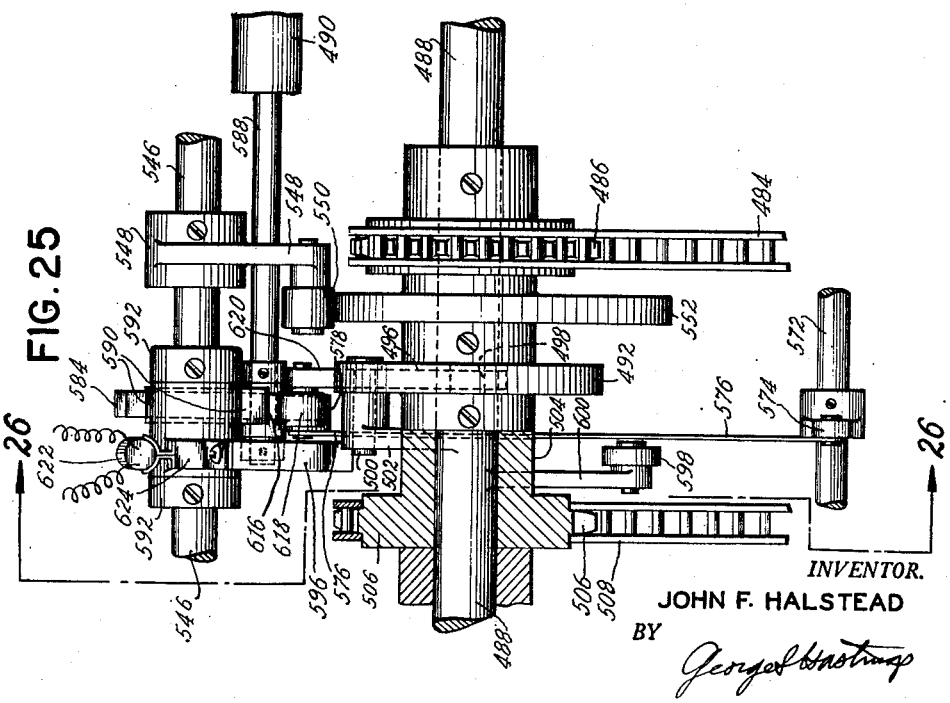

United States Patent Office 2,808,058
Patented Oct. 1, 1957

2,808,058

METHOD OF ALIGNING TOBACCO LEAVES ON A FEED CONVEYOR AND THE FILLER FEED IN A CIGAR BUNCH MACHINE

John F. Halstead, Brooklyn, N. Y., assignor to International Cigar Machinery Co., a corporation of New Jersey Original application August 31, 1944, Serial No. 552,042. Divided and this application November 19, 1952, Serial No. 321,324

28 Claims. (Cl. 131—21)

This is a division of my co-pending application for Letters Patent filed August 31, 1944, and assigned Serial No. 552,042, now Patent No. 2,625,938.

This invention relates to long filler cigar machines, more particularly to apparatus for removing leaf tobacco from a bulk supply and delivering to the filler feed of the cigar machine. Heretofore, the leaf tobacco was laid manually in shingled relationship in the filler feed channel of the cigar machine to form a continuous layer of leaf tobacco from which bunch lengths were severed for assembly in a column from which bunch charges were separated for delivery to mechanism wherein a binder is wrapped about the bunch charge to form a bunch. Moreover, the uniformity of the bunches so formed depended upon the skill of the attendant who laid the leaf tobacco in the filler feed channel.

It is one of the main objects of the invention to automatically form a layer of tobacco in the filler feed channel or other type of cigar filler feed, from which sections may be separated for the manufacture of cigar bunches. To this end, the bulk supply of leaf tobacco may be supported in a revolving drum which is provided with internal cups having suction openings to which individual tobacco leaves will adhere and be carried upwardly from underneath the bulk supply of leaf tobacco and deposited upon an inclined chute extending into the drum.

In this connection, it should be pointed out that other types of filler feeds have been devised wherein a layer of leaf tobacco arranged transversely of the filler feed is advanced to feed its leading edge into the filler feed channel, and the portion of the tobacco layer so advanced into the filler feed channel is severed. The filler feed is then advanced a distance less than the length of the severed section and the severed edge of the layer of tobacco is fed into overlapping relationship with the previously severed section, whereupon an additional section is severed from the leading edge of the tobacco. In a similar manner a number of tobacco sections are assembled on the filler feed in shingled relationship to form a continuous stream of tobacco. Due to the cutting of the layer of leaf tobacco there will be formation of scrap which may accumulate adjacent the cutter and fall into the stream of tobacco on the filler feed and impair the uniformity of bunch lengths subsequently separated from said stream. Moreover, if the cutter should sever a tobacco leaf adjacent one of its edges, narrow strips of leaf tobacco, or small pieces, may be formed which are objectionable in long filler cigars. For the above reasons, any cutting of the filler before it enters the cigar machine is considered very objectionable by the cigar manufacturers. One of the main objects of this invention is to avoid all cutting of the filler and thereby eliminate this objection and at the same time provide a simplified construction. No knife or cutting operation is necessary in this construction because the full width filler leaves are aligned and shaped to fit the width of the feed belt channel.

Another important object of the invention is to align the leaf tobacco prior to delivery to the filler feed channel, so that the lengths of the leaves (which are at random in the bulk supply) will extend lengthwise when deposited in this channel. For this purpose, the tobacco leaves sliding down the chute to which they are transported from the bulk supply in the drum, are delivered between members having vertical surfaces to a continuously traveling belt which is driven at the proper speed to cause the leaves to assume a position extending lengthwise of the direction in which the belt is traveling.

Still another object is to pleat or corrugate the leaves, which may be broader than the width of the filler feed channel, so that they may be properly inserted in the filler feed channel. Thus, the layer of leaf tobacco so formed will fill the filler feed channel as uniformly as if it had been placed therein manually.

Among other objects it is intended to provide blending of various types of leaf tobacco in the cigar filler feed. Accordingly, one or more auxiliary feed drums, which may be of slightly simpler construction than the main feed drum when handling Havana or similar shorter types of leaf tobacco, may be arranged to deliver the leaf tobacco upon the same traveling belt upon which the leaf tobacco is delivered from the main feed drum. In this manner, the tobacco leaves are blended and aligned with each other.

Another object of the invention is to form a shingled layer of tobacco on the filler feed which is similar to that prepared manually. For this purpose, the tobacco leaves are delivered endwise into a magazine to form a layer of shingled leaf tobacco therein and the shingled layers are deposited in overlapping relationship upon the filler feed. In prior automatic filler feeds the leaf tobacco was not assembled in a shingled layer before being deposited in the filler feed channel.

Other objects of the invention are to provide for automatically controlling the quantity of tobacco delivered to the filler feed from the bulk supply in order to form a layer of substantially uniform thickness. To obtain this objective a novel control mechanism causes the feed drums to run for a longer or shorter interval depending upon the thickness of the layer of tobacco in the feed channel, or stop revolving, in each cycle of operations.

It should be noted that the length of the magazine in which the leaves are assembled in shingled relationship prior to being deposited in the filler feed channel, is of substantially the same length as the portion of the filler feed channel in front of the compressor. If this were not the case, and the magazine were shorter than the portion of the filler feed channel in front of the compressor, the successive layers of tobacco delivered from the magazine to the filler feed channel to form a stream of tobacco would assume inclined positions in the filler feed as they are successively overlapped on previously deposited layers. Thus, the layers of tobacco in the bunch lengths severed from the stream of tobacco would extend more or less diagonally of the bunch lengths, which is undesirable. With my construction, since the layers of tobacco assembled in the magazine are nearly of the same length as the filler feed channel, when they are deposited in the filler feed channel, they will extend almost horizontally of the channel and the bunch lengths separated from the stream of tobacco. Accordingly, still another object of the invention is to deposit in overlapped relationship in the filler feed channel layers of leaf tobacco of a length approximately that of the channel.

If desired, the speed at which the auxiliary feed drum is driven may be changed to vary the proportion of Havana or other leaf tobacco blended with the filler tobacco delivered from the main feed drum. For this purpose, the sprocket driving the chain running over a sprocket fastened on the auxiliary feed drum may be replaced by a sprocket of different diameter to drive the auxiliary drum at a different speed. Moreover, in case only a small proportion of Havana leaf tobacco is to be blended with the main filler, scrap Havana tobacco may be placed in the auxiliary drum to be delivered to leaf tobacco fed from the main drum.

The bunch lengths separated from the continuous layer of leaf tobacco in the filler feed may be assembled in superimposed relationship to form a vertical column of tobacco. By formation of this type of column any inequalities that may be formed in the layer of tobacco in the filler feed will be compensated in the vertical column. Thus, the uniformity of the bunch charges separated from the vertical column will be assured.

With these and other objects not specifically mentioned in view, the invention consists in certain constructions and combinations hereinafter fully described and set forth in the appended claims.

In the accompanying drawings which form a part of this specification and in which like characters of reference indicate the same or like parts:

Figs. 1 and 1A when joined at line A—A show a complete side elevation of the machine;

Figs. 2 and 2A when joined at line B—B show a sectional end elevation of the machine as seen from line 2—2 of Fig. 1A;

Fig. 3 is another sectional end elevation of the machine taken on line 3—3 of Fig. 1;

Fig. 4 is a sectional end elevation of the tobacco feed drum, taken on line 4—4 of Fig. 1;

Fig. 5 is a sectional end elevation of the tobacco feed channel;

Fig. 6 is a partial side elevation of the same as seen from line 6—6 of Fig. 5;

Fig. 7 is a sectional side elevation of the tobacco feed magazine taken on line 7—7 of Fig. 2, the magazine cover illustrated in open position during the tobacco receiving period;

Fig. 8 is a similar sectional side elevation of the feed magazine, the magazine cover being illustrated in closed position after receiving the tobacco leaves;

Fig. 9 is a partial rear elevation of the machine illustrating the tobacco feed magazine in conjunction with the feed plunger and cigar bunch machine cross-feed channel as viewed from line 9—9 of Fig. 2;

Fig. 10 is a plan view of the same as seen from line 10—10 of Fig. 9;

Fig. 11 is a detail side elevation of the feed plunger with the floating side plate of the same removed;

Fig. 12 is a partial side elevation of the feed plunger showing the mounting of the floating side plate of the same in detail;

Fig. 13 is a cross-section of the feed plunger, taken on line 13—13 of Fig. 12;

Fig. 14 is a partial plan view of the feed plunger as taken from line 14—14 of Fig. 12;

Figs. 15 to 20 illustrate the successive steps in the operation of transferring the tobacco from the feed magazine into the filler feed channel of the cross-feed of the cigar machine;

Fig. 21 is a plan view of the tobacco feed control mechanism;

Fig. 22 is an end elevation of the same;

Fig. 23 is a partial side elevation of the feed control bars;

Fig. 24 is a bottom view of the same as seen from line 24—24 of Fig. 23;

Fig. 25 is a detailed side elevation of the cross-feed control mechanism;

Fig. 26 is a sectional end elevation of the same, taken on line 26—26 of Fig. 25.

Figure 1:
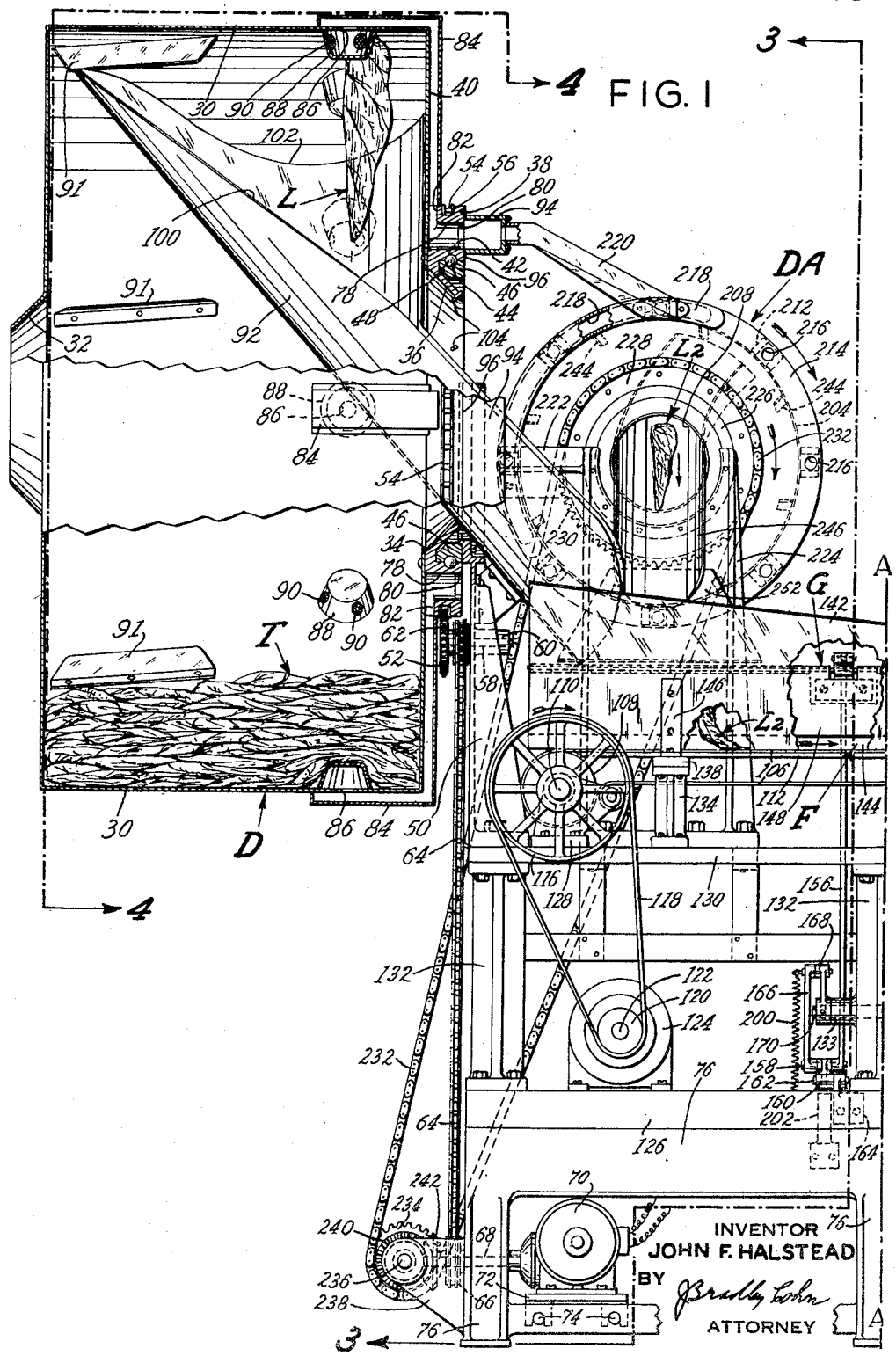

In the particular embodiment selected to illustrate the invention, the automatic filler tobacco feed consists of a revolving tobacco feed drum D, a tobacco feed channel and conveyor F, a magazine M, and a cigar machine cross-feed C. The tobacco feed drum D (Figs. 1, 3 and 4) consists of a cylindrical hollow body 30 provided in the rear wall thereof with an opening 32 (Fig. 1) through which the tobacco leaves T are inserted by an attendant. The opening 32 is conically shaped to prevent tobacco leaves from falling out while the drum is revolving. The drum body 30 is also provided in its front wall 40 with a circular opening 34 from which the escape of tobacco leaves is prevented by a conical flange 36 of a ring-shaped member 38 fastened on the front wall 40. Member 38 is provided with an annular groove 42 which in conjunction with a corresponding groove 44 of a race 46 and balls 48 forms a ball bearing and, since race 46 is mounted on a stationary bracket 50, provides means for supporting drum D and for allowing the latter to be rotated. The drum D is rotated by a sprocket 52 (Figs. 1 and 3) which drives a chain 54 held in an annular groove 56 of the member 38. Sprocket 52 is mounted on a shaft 58 held by a suitable bearing lug 60 (Fig. 1) of bracket 50. To sprocket 52 is secured another sprocket 62 which is driven by a chain 64 from a sprocket 66 mounted on a shaft 68 extending from a worm gear reduction motor unit 70 attached to a suitable platform 72 supported by rods 74 held by a supporting frame 76.

Member 38 is furthermore provided with a number of equally spaced ducts 78 each of which has an outlet 80 in the outer face of said member and an inlet 82 in the rim thereof. The inlets 82 communicate with the inner ends of a series of conduits or ducts 84 which are fastened to the wall 40 of the drum 30 of the main feed D and communicate at their outer ends with corresponding holes 86 in the periphery of drum 30. Within the drum 30 are mounted a series of conical cups 88 which cover holes 86 and are provided with one or more suitable screened openings 90. A feed chute 92 fastened to bracket 50 extends at a suitable angle through conical flange 36 and opening 34 into drum D. While the upper end of said feed chute almost contacts the inner face of the cylindrical wall of the feed drum, the lower end of said chute projects into the feed conveyor channel F. To the upper end of bracket 50 is also attached an arcuate duct 94 which has a length somewhat less than half the circumference of member 38 and is connected by a pipe 98 to a conventional source of suction such as a suction fan (not shown). The open side of duct 94 contacts the outer face 96 of member 38 so that suction is supplied to all ducts 78 of said member of which the corresponding outlets 80 happen to be covered by said duct 94 (Fig. 1).

The operation of the tobacco feed drum D is as follows: After a sufficient quantity of tobacco leaves T are thrown into said drum by the attendant. Tobacco is thus arranged in bulk in the drum in an aggregate that might be termed random or haphazard. In any event, it is not necessarily arranged in any orderly fashion. The drum is revolved in the direction of the arrow (Figs. 3 and 4) by the gear reduction motor unit 70 and the connecting parts described above, and the conical cups 88 plow through the mass of the tobacco leaves T tumbling in the bottom portion of said drum. While the outlets 80 of ducts 78 are passing underneath the open side of duct 94, suction is applied to the corresponding cups and one or two tobacco leaves L will adhere to the screened openings 90 of said cups and will be carried upward above the feed chute 92. Since the duct 94 ends at its uppermost point above chute 92, the outlets 80, after passing this point, are no longer connected with the source of suction, and the leaves drop into the chute 92. The cups 88 continue revolving with the drum without suction until openings 80 again come in contact with the lower end of the duct 94. The length of the latter is so arranged that the cups 88 are not supplied with suction when moving toward their lowermost position, and not until they are slightly beyond this position, so that the leaves are not picked from the bottom of the mass of tobacco leaves but at the upper region thereof.

This construction has the advantage of preventing the leaves L after they have once been picked up by the suction acting upon the screened openings 90 of cups 88 from being torn away by the shifting mass of the tobacco leaves T in the revolving drum. The cups 88 are made conical for the purpose of preventing any leaves which are not lifted out of the mass by suction from being carried upward on the cups. Therefore, any leaf just hanging over said cups will slide off before reaching the feed chute. The side walls of the latter are designed in such a way as to provide a low portion 100 on the side wall over which the leaves are carried and a high portion 102 on its other side wall, thus assuring that every leaf will be stripped from its cup by engagement with portion 102 in case it continues adhering to the same after the suction is taken off. The lower ends of these sidewalls are of approximately the same height and high portion 102 is curved at its upper edge and has a vertical edge extending downwardly to the lower end of its side wall and contacting the interior of the front wall 40 of the feed drum. Thus, any leaf, after it is once deposited into the feed chute 92, cannot be carried back into drum 40. There are also provided a series of pins 104 adjacent the outer edge of conical flange 36 which will push any leaf into the feed chute 92 as it slides along the sidewall thereof in case it dropped off the cup too early and onto the edge of the sidewall 100 of feed chute 92.

In order to direct the tobacco leaves T, especially when there are only a few left in the drum, toward the suction cups 88, the interior of the drum is equipped with a number of angularly mounted deflector plates 91 which prevent any leaves or mass of leaves from accumulating at the rear end of the drum and remaining out of contact with said suction cups. Thus, said deflector plates 91 make it possible for the suction cups to pick up every leaf in the drum without the necessity of refilling said drum when the tobacco mass T reaches a low level.

As mentioned heretofore, the leaves drop into the feed chute and slide downward into the conveyor channel F. The latter consists of an endless conveyor belt 106 constantly driven in the direction of the arrow (Fig. 1) by means of a pulley 108 mounted on a shaft 110. Said belt is led over a supporting plate 112 and an idler pulley 114. Shaft 110 is constantly driven by a pulley 116, which in turn is driven through a belt 118 by a pulley mounted on a motor shaft 122 of a motor 124 secured to a bed plate 126 mounted on the supporting frame 76. Shaft 110 is supported by a pair of suitable bearing brackets 128 secured to a plate 130 held by a pair of frame brackets 132 attached to the bed plate 126 (Fig. 1). Plate 130 also supports the drum supporting bracket 50, a pair of brackets 134, and another pair of brackets 136. Brackets 134 and 136 carry a pair of cross bars 138 to which the plate 112, which supports conveyor belt 106, is attached. Brackets 136 are also equipped with suitable bearing lugs which carry a shaft 140 on which the idler pulley 114 is mounted. The sides of the feed channel F are formed by two vertical guide plates 142 and 144 each of which is held by a pair of angle plates 146 secured to cross bars 138. The conveyor channel F is furthermore provided with a cam-operated gate G (Figs. 1, 3, 5 and 6) for the purpose of preventing any leaves from dropping through the channel and onto the continuously running conveyor belt 106 thereof after the cover of the magazine M is closed.

The channel gate G consists of a gate plate 148 hinged upon a horizontal rod 150 supported in lugs on the upper edge of the channel side wall 144. To the upper central portion of gate plate 148 is secured an operating lug 152 which is also pivoted to the hinge rod 150. Said lug 152 protrudes through a suitable opening or cut-out 154 in side wall 144 to the rear of the same and is connected by a link 156 to a pivot pin 158 (Figs. 1 and 3) on an arm 160 pivoted to a shaft 162 supported by a suitable bracket 164 secured to the side of bed plate 126. The pivot pin 158 of arm 160 is connected by a link 166 to an arm 168 secured on one end of a shaft 170, which is supported in one of the brackets 132. To the other end of said shaft 170 is secured another arm 172 (Figs. 1A and 2A) which is connected by a link 174 to a cam lever 176 loosely mounted on a shaft 178 supported by suitable bearing lugs of a bridge bracket 180 secured to the cigar machine frame 182 and an extension bracket 184 of supporting frame 76. From the hub of lever 176 extends an arm 186 which carries a cam roller 188. The latter at the proper phase of the cycle of the machine is contacted by a cam segment 190 secured to the periphery of a cam 192 mounted on a cam shaft 194 of the cigar machine. Cam shaft 194 is supported by a bracket 196 secured on bridge bracket 180 and suitable bearings in the cigar machine frame 182. Shaft 170 is supported by a suitable bearing lug 133 in one of the frame brackets 132 and a bearing bracket 198 mounted on bridge bracket 180. A tension spring 200 (Figs. 1 and 3) fastened to pivot pin 158 and anchored to frame 76 is employed to keep gate 148 in closed position, i. e., in upward position, as shown in dotted lines in Fig. 5, except during that period of the cycle when cam roller 188 rides on the cam segment 190 described above. A stop lug 202 (Figs. 1 and 3) mounted on the rear side of frame 76 is provided to check the upward movement and closed positions of gate 148 by restricting the extent of downward movement of arm 160.

The continuously running conveyor belt 106 must have the proper speed to cause the leaves sliding onto said belt between the plates 142 and 144 to be carried away in a longitudinal position with respect to their direction of travel. This feature is quite important since there may be one or more auxiliary feed drums DA delivering tobacco leaves at right angles to the traveling belt. The speed at which the belt 106 should be driven has been found to be of a magnitude which will give the leaves the necessary momentum when leaving belt 106 to cause them to slide into the magazine M without turning over.

As mentioned heretofore, there may be one or more auxiliary feeds employed in addition to the main feed drum D. These auxiliary feeds are chiefly used for blending purposes, so as to add Havana tobacco leaves and/or other tobacco leaves to the main filler tobacco. The auxiliary feed drum is of smaller size and is provided with screened suction openings in its periphery instead of the cups used in the main feed drum, because the shorter lengths of the Havana leaves will be picked up effectively with screened suction openings.

With the longer lengths of Pennsylvania leaf tobacco used in the main feed drum, the wrinkling thereof might interfere with the adhesion of the leaf tobacco to suction openings such as employed in the auxiliary feed drum. In Figs. 1 and 3 is illustrated an auxiliary feed DA which consists of a hollow drum 204 having a conical filling opening 206 (Fig. 3) and a conical feed or discharge opening 208 (Fig. 1). The cylindrical portion of drum 204 is provided with a number of equally spaced holes 210 (Fig. 3) each of which is covered by a hollow suction box 212 secured to a flange-like extension of the front wall 214 of drum 204. Each suction box communicates with an opening 216 in the flange of front wall 214.

Like the main feed drum D, drum 204 is provided with a stationary semicircular suction duct 218 having its open side contacting the flange of front wall 214 of drum 204 and supplying suction to every hole 216 in said flange which happens to be underneath and facing the open side of the suction duct 218 and thereby applying suction through the boxes 212 to the corresponding holes 210.

Duct 218 by means of a pipe 220 is connected to the semicircular suction duct 94 of the main feed drum D. The suction duct 218 is secured to and supported by a lug 222 (Fig. 1) extending from a supporting bracket 224. To the inner face of the latter is fastened a ring 226 (Fig. 1) provided with an external circumferential groove in which are mounted ball bearings (not shown), which support a race 228 attached to the front wall 214 of drum 204, thereby providing a revolving support for said drum. Since the support for drum 204 is similar to the support for drum 30, further description thereof is deemed unnecessary.

On the periphery of the race 228 are provided sprocket teeth forming a sprocket 230 which through a chain 232 is driven from a sprocket 234 mounted on a shaft 236 which is supported by suitable bearing lugs 238 extending from the lower portion of frame 76. On shaft 236 is mounted a bevel gear 240 which meshes with and is driven from a bevel gear 242 mounted on shaft 68 which also drives the main feed drum D.

In order to prevent the tobacco leaves in the auxiliary drum from being drawn into the openings 210 by suction, said opening may be covered by screens. Since the auxiliary feed drum is smaller and the quantity of tobacco leaves placed in the same is much less than is used in the main feed drum, the conical suction cups 88 used in the latter are eliminated and replaced by the screened holes 210, for it was found that it is not necessary to counteract the sliding effect of the tobacco mass when a leaf is pulled out of a comparatively small mass. Within the cylindrical body of drum 204 are also secured a number of angularly mounted deflector plates 244 which serve the same purpose as plates 91 in the main feed drum. An inclined feed chute 246, which is similar in construction and principle to feed chute 92 of the main drum, extends into drum 204 and is supported by a bracket 248 (Fig. 3) secured to the drum supporting bracket 224. Bracket 224 is mounted on an extension 250 of plate 130. The lower end of chute 246 overlies inclined guide plate 252 which extends above the upper edge of side wall 144 of the feed conveyor F. Plate 252 is suitably secured to supporting bracket 224.

The operation of the auxiliary feed DA is the same as that of the main feed D. The tobacco leaves in drum 204 are picked up by suction supplied to the screened openings 210 and carried upward above the chute 246 to a point where the suction duct 218 terminates, and the released leaf L2 (Fig. 1) drops into the inclined feed chute 246 and slides into the conveyor channel F. It should be again emphasized that the conveyor belt 106 should have the proper speed to carry the contacting end of said leaf away quickly enough to cause said leaf to assume a position extending longitudinally of said conveyor channel. See leaf L2 within the broken away portion of channel F in Fig. 1.

As previously mentioned, the leaves L, and, of course, the leaves L2, are conveyed into the magazine M and the first leaf L1 (Fig. 7) due to the momentum imparted to it by belt 106 slides on the bare bottom of said magazine and almost to the end of the same. Each following leaf will slide less, and since it falls on top of the preceding leaf, the layer of tobacco leaves so formed assumes somewhat of a shingled formation. However, the formation and position of the leaves depends a great deal on the size and weight of the tobacco leaves. The magazine M consists of a stationary bottom plate 254 and two stationary vertical side plates 256 and 258. Said side plates are secured at one end to suitable lugs 260 (Figs. 1A, 9 and 10) of a bracket 262 mounted on a platform 264 (Figs. 1A, 2 and 10) supported by suitable brackets fastened to a bed plate 266 of the cigar machine frame 182. The other ends of side plates 256 and 258 are attached to and held by supporting bars 268 mounted on a plate 270 fastened to and supported by the cross feed supporting bracket 272 extending from and secured to platform 264.

The stationary magazine bottom plate 254 extends across one of the cross feed belt covers 274, which encloses the outer vertical run and the space between the vertical runs of one of the vertical side belts 418, and is attached to a pair of suitable blocks 276 (Figs. 1A, 2, 8 and 7) secured to plate 270 and bracket 272. Lugs 260 of bracket 262 are provided with a pair of hubs 278 (Figs. 2 and 10) which support a horizontal shaft 280 on which is mounted a cover supporting member 282. To the latter is secured a magazine cover plate 284 which is operated, i. e., opened and closed, by lever 286 mounted on the protruding end of shaft 280. Lever 286 by means of a link 288 is connected to a cam lever 290 loosely mounted on a horizontal shaft 292 supported in suitable bearings of bridge bracket 180. From the hub of lever 290 extends an arm 294 carrying a cam roller 296 engaging with a cam track 298 of a cam 300 mounted on the cam shaft 194. In order to avoid over-travel and provide for alignment of the lower face of the cover plate 284 with the lower edges of side walls 256 and 258 when the cover is in its lowermost, i. e., closed position, the magazine is provided with a stop rod 302 pivoted at one end to the cover supporting member 282 and protruding through an elongated hole 304 (Fig. 10) of a cross bar 306 connecting the side walls 256 and 258. Rod 302 is threaded at its free end and a pair of lock nuts 308, which are threaded thereon, arrest the downward movement of the magazine cover when they contact the top of cross bar 306.

The magazine M is also equipped with a tobacco pusher 310 which serves to push the tobacco deposited in the magazine on to the bridge plate 324 located above the feed channel K of the cigar machine cross-feed. The horizontal pusher bar 310 rests on the bottom plate 254 and is slidable thereon. When the pusher 310 is in its rearmost position (Fig. 2) it closes the gap between the bottom edge of side plate 256 and the bottom plate 254 and is in exact alignment with the inner face of side wall 256. Bar 310 is reciprocated by two rods 312 projecting rearwardly from said bar. On the outer end of each rod 312 is fastened a forked lug 314, and each lug 314 is pivotally connected to the upper end of an arm 316. Both arms 316 are secured on the horizontal shaft 178, and from the hub of one of the arms 316 extends a cam lever 318 carrying a cam roller 320 engaging with a cam track 322 Fig. 2A) of the cam 192.

As previously mentioned, a predetermined quantity of tobacco leaves is deposited into the magazine M, and then the feed drums are automatically stopped and further delivery of tobacco ceases. The magazine cover 284 which during the tobacco receiving period is in its upward position (Fig. 7) then moves downward and closes said magazine (Fig. 8), the cover plate 284 then being parallel with the magazine bottom plate 254. Figures 15 to 20, inclusive, illustrate how the tobacco deposited in said magazine is transferred from the same into the feed channel K of the cigar machine cross feed C. Fig. 15 shows the magazine cover in open position but ready to swing downward at the end of the tobacco receiving period.

While the magazine covers descends, a plunger P, which is slidably supported from a bracket 342 attached to side wall 258, rests on a bridge plate 324 which forms a continuation of the bottom plate 254 of the magazine M. One side wall of said plunger P, during the delivery of tobacco to the magazine, closes a gap 326 between the lower edge of side wall 258 and the bottom plate 254. The bridge plate 324 also covers the cross feed channel K during the descent of the magazine cover. As soon as the magazine cover has reached its lowermost position, the pusher bar 310 moves in the direction of the arrow (Figs. 15 and 16) and pushes the tobacco layer T4 from the bottom plate 254 of the magazine through the gap 326 onto the bridge plate 324. In the meantime, the plunger P has moved upward to a position where its bottom surface forms a continuation of the bottom face of the cover plate 284 and the bottom edge of side wall 258 (Fig. 16).

The plunger P is equipped with a slidable side wall 328 which remains in contact with the top face of bridge plate 324 while the plunger P moves upward to the position just described. Thus, plate 328 forms a stop against which the tobacco layer T4 is moved by the advancing pusher bar 310. Since the width of the space underneath the plunger P, which is approximately the same width as the cross feed channel K is much narrower than the width of the tobacco layer T4, the latter after its outer edge has contacted plate 328, assumes a somewhat pleated formation (Fig. 17). As the pusher bar 310 approaches the edge of the feed channel K, the bridge plate 324 starts to withdraw from underneath the pleated tobacco layer and plunger P (Fig. 17). The continued withdrawal of bridge plate 324 uncovers the feed channel K and permits the pleated tobacco layer to drop into said feed channel (Fig. 18) and overlaps a portion of a previously deposited layer of tobacco. The plunger P then descends in the direction of the arrow (Fig. 18) and compresses the tobacco layers in the feed channel (Fig. 19). After this compressing operation, the plunger P ascends again and the pusher bar returns to its original position in line with the lower edge of the wall 256 of the magazine M. Before returning to its original position, plunger P moves to a position high enough to permit the bridge plate 324 to move back over the feed channel in an upwardly inclined position (Fig. 20). The plunger P then moves downward and comes to rest on said bridge plate.

In the meantime, the magazine cover 284 also has returned to its open position and the magazine is ready to receive a new quantity of leaves. It may be assumed that the cam operating the magazine cover is so synchronized with the cam operating the gate 148 in conveyor channel F to cause said gate to close as soon as the magazine cover starts its downward motion, thus preventing any leaves which might drop at the last moment into said conveyor channel F from being delivered on top of said magazine cover. The motion of all feed drums, of course, is also stopped by means of an automatic control which will be described later on.

The plunger P (Figs. 2 and 9–14 inclusive) consists of a suitable channel shaped member 330 to which is secured a bottom plate 332 and a side plate 334 (Fig. 13). The central portion of member 330 is provided with a pair of lugs 336 projecting inwardly from the vertical flanges thereof and carrying a stud 338 on which is pivotally mounted a plunger bar 340 which is slidably supported by a guide bracket 342 secured to the outer face of the magazine side wall 258. Plunger bar 340 is connected by a link 344 (Figs. 1A and 9) to a plunger control arm 346 which is mounted on a shaft 348 supported in suitable bearings of bracket 262. Arm 346 is connected by a link 350 to a cam lever 352 (Figs. 1A and 2A) loosely mounted on shaft 292. Link 350 is provided with a slot 351 (Fig. 2A) providing a lost motion connection to allow the plunger P to settle itself on the level of the tobacco stream in the cross feed channel K. Cam lever 352 is provided with an arm 354 carrying a cam roller 356 engaging with a cam track 358 of cam 300 on cam shaft 194 (Fig. 2A), cam track 358 being designed to effect the ascending and descending movement of plunger P.

As was previously mentioned, plunger P is provided with a sliding side wall 328 to which are secured a number of guide plates 360 slidably engaging with vertical slots 362 in one vertical flange of member 330. Each guide plate 360 is provided with a dovetail slot 364 which engages with a flat head screw 366 threaded into said vertical flange of plunger member 330. The lower end of guide bar 368 is secured in a slot in the latter and carries on its upper end a guide roller 370 (Fig. 11) which engages with a track 372 of a guide bracket cover plate 374 secured on the guide bracket 342. The track 372 is provided at a suitable point with an indentation 376 (Fig. 11) designed for the purpose of permitting plunger P upon descending onto the tobacco layer in the cross feed channel to tilt upwardly when contacting and compressing the tobacco. This feature is important since the feed belts of the cross feed channel K advance the tobacco layer in said channel intermittently only the customary distance of one bunch length. Since the layer added each time from the magazine is considerably longer than that distance, a shingled layer of tobacco is produced whose front end is of considerably greater thickness than the rear end of the same as illustrated in Fig. 11.

In operation, the plunger P will descend into a position parallel to the bottom feed belt 378 of the cross feed channel K as long as roller 370 is guided in the upper straight portion of track 372, but as soon as the bottom plate 332 has contacted the tobacco the roller 370 will have just about reached the indentation 376 of track 372 and said plunger is free to adjust itself to the somewhat angular level of the top of the tobacco layer in the feed channel. In order to prevent any injury to the feed belt 378 by the rear edge of the bottom plate 332 in case there is little tobacco in the channel, the indentation 376 is so designed that it merges into a straight vertical track at a point which will tilt the plunger P back to a parallel position shortly before the rear edge of the plunger plate 332 touches the feed belt. Thus, the straight bottom portion of track 372 forces the plunger P to assume a parallel position with respect to feed belt 378.

To the bottom of bridge plate 324 are secured two lugs 380 and 382 each of which is pivotally connected by studs 384 and 386, respectively, to arms 388 and 390 (Figs. 9 and 10). Arms 388 and 390 are fastened on a shaft 392 (Figs. 1A and 2A) held by suitable bearing lugs 394 (Fig. 2A) extending from the bridge bracket 180. Shaft 392 is actuated by means of a cam lever 396 which is secured thereon and carries a cam roller 398 engaging with a cam track 400 of the cam 192 on cam shaft 194. The lug 382 is provided with an extension 402 (Figs. 2, 9 and 15–20) having a curved outer end 404 which engages with a spring pressed ball lock 406 supported by a suitable lug 408 attached to the side of arm 388. Bridge plate 324 is withdrawn from its feed channel covering position (Fig. 15) when the arms 388 and 390 move in the direction of the arrow in Fig. 17. The weight of plate 324 causes the latter to remain in contact with the top surface of the other feed belt housing 274 and slide over the same during the withdrawal movement of said plate effected by the backward movement of arms 388 and 390, and the ball of the spring mounted ball lock 406 rides on the curved free end 404 of lug extension 402 of lug 382. The bridge plate 324 remains almost parallel to the top surface of the feed-belt housing until lug extension 402 contacts a stationary stud 410 (Fig. 18) which, upon a continued backward movement of arm 388, causes bridge plate 324 to swing upward (Fig. 19).

Thus, the ball of the spring-mounted ball lock engages in an indentation 412 of lug 402 and locks lug 382 and plate 324 in an upwardly inclined position (Fig. 19). The movement of arm 388 is so timed that at this moment arm 382 has reached its rearmost position. Arms 388 and 390 dwell in their rearmost positions for a sufficient length of time to allow the plunger P to perform its function and ascend to its uppermost position. Arms 388 and 390 then return, carrying the bridge plate 324 in its locked upwardly inclined position until the extension 402 of lug 382 contacts another stationary stud 414 which, during a continued forward movement of said arm, effects disengagement of the ball lock 406 from the indentation 412 of the curved end 404 of said lug and causes bridge plate 324 to swing downward over the cross feed channel K and cover the same. The swinging of the bridge plate 324 over the cross feed channel is done for the purpose of simulating the hand motion of the feed operator which would push down any portion of a leaf which might spring up after ascent of the plunger P. A sliding motion of said plate might jam a projecting piece of tobacco leaf between the plate and the side edges of the feeding channel and cause a disturbance of the tobacco stream when the feed belts advance. The stationary studs 410 and 414 are secured to a projecting portion of a suitable plate 416 attached to the lower side of plate 270 (Figs. 2 and 9).

The cross feed channel K is of conventional construction and consists of a horizontal bottom belt 378 and a pair of vertical side belts 418. As previously mentioned, bottom belt 378 is supported by plate 270 and is intermittently driven by a pulley 420 (Fig. 1A) mounted on a shaft 422 (Fig. 1A) supported by suitable bearings of platform 264. The horizontal belt 378 also runs over and is supported by pulleys 424 and 426 supported by platform 264 and pulley 428. The latter is supported by a shaft 430 held by an adjustable bearing 432 supported by bracket 272. The vertical feed belts 418 are supported by pulleys 434 and 436 and 438 (Fig. 10). The latter are mounted on vertical shafts 440 (Fig. 2) on whose lower ends are secured bevel gears 442 which mesh with bevel gears 444 mounted on the ends of the horizontal shaft 422. On one of the shafts 440 is also mounted a spur gear 446 (Fig. 1A) which meshes with a pinion 448 secured to a vertical shaft 450 supported by a suitable bearing bracket 452 attached to a pedestal 454 secured to bed plate 266. On the lower end of shaft 450 is mounted a bevel gear 456 meshing with a bevel gear 458 secured to a horizontal shaft 460 (Figs. 1A and 2A) supported in suitable bearings of pedestal 454.

Shaft 460 is intermittently driven by a ratchet 462 during the forward stroke of a pawl 464 pivoted on a stud 466 at one end of an arm 468. The latter is loosely mounted on shaft 460 and is oscillated by an arm 470 connected thereto by pin 472, arm 470 being provided with slot 476 engaging a pin 474 on a crank 478 mounted on a shaft 480. The latter carries a sprocket 482 (Fig. 1A) driven through a chain 484 from a sprocket 486 secured on a shaft 488 (Figs. 1A, 2, 25 and 26) which is supported by suitable bearings of a bracket 490 secured to platform 264. On shaft 488 is also secured a clutch disc 492 carying a tooth 494. The clutch disc 492 is driven by an arm 496 provided with a recess 498 which normally engaged with the tooth 494 of said disc. Arm 496 is pivoted to a stud 500 (Figs. 25 and 26) held by an arm 502 extending from a hub 504 of a sprocket 506 loosely mounted on shaft 488, and a spring 501 connecting arms 496 and 502 normally maintains recess 498 of arm 496 upon tooth 494. Sprocket 506 through a chain 508 (Figs. 2, 2A and 25) is continuously driven by a sprocket 510 integral with a sprocket 512 loosely mounted on shaft 480.

Sprocket 512 is driven through a chain 514 (Figs. 1A and 2A) by means of a sprocket 516 mounted on a shaft 518 which may be considered the main drive shaft of the cigar machine, and is suitably driven from a source of power (not shown). Chain 514 also drives a sprocket 520 mounted on the main cam shaft 194.

The cigar machine cross feed C illustrated in the drawings in connection with the automatic tobacco feed is of the type disclosed in my Patent 2,284,472 issued May 26, 1942. The stream of filler tobacco is advanced intermittently by feed belts 378 and 418 beneath a hinged guide plate 522 (Figs. 9 and 10) pivoted on a stud 524 held by a lug 526 attached to the outer face of magazine wall 258. Plate 522 is employed for the purpose of guiding the tobacco stream S underneath a compressor 528 and preventing any standing pieces of tobacco from catching on said compressor foot. The latter is suspended by suitable links from a bracket reciprocably mounted on bracket 490 and is of the same construction and performs the same function as disclosed in my Letters Patent 2,284,472 mentioned above. The cross feed is also provided with a corrugated cutter 530 (Fig. 1A) which is slidably mounted in bracket 490 and descends to sever a bunch length from the tobacco stream. Since the construction of the mechanism for operating the compressor foot 528 and the cutter 530 is the same as that shown in my Patent 2,284,472, further description thereof is deemed unnecessary.

Figure 1A:
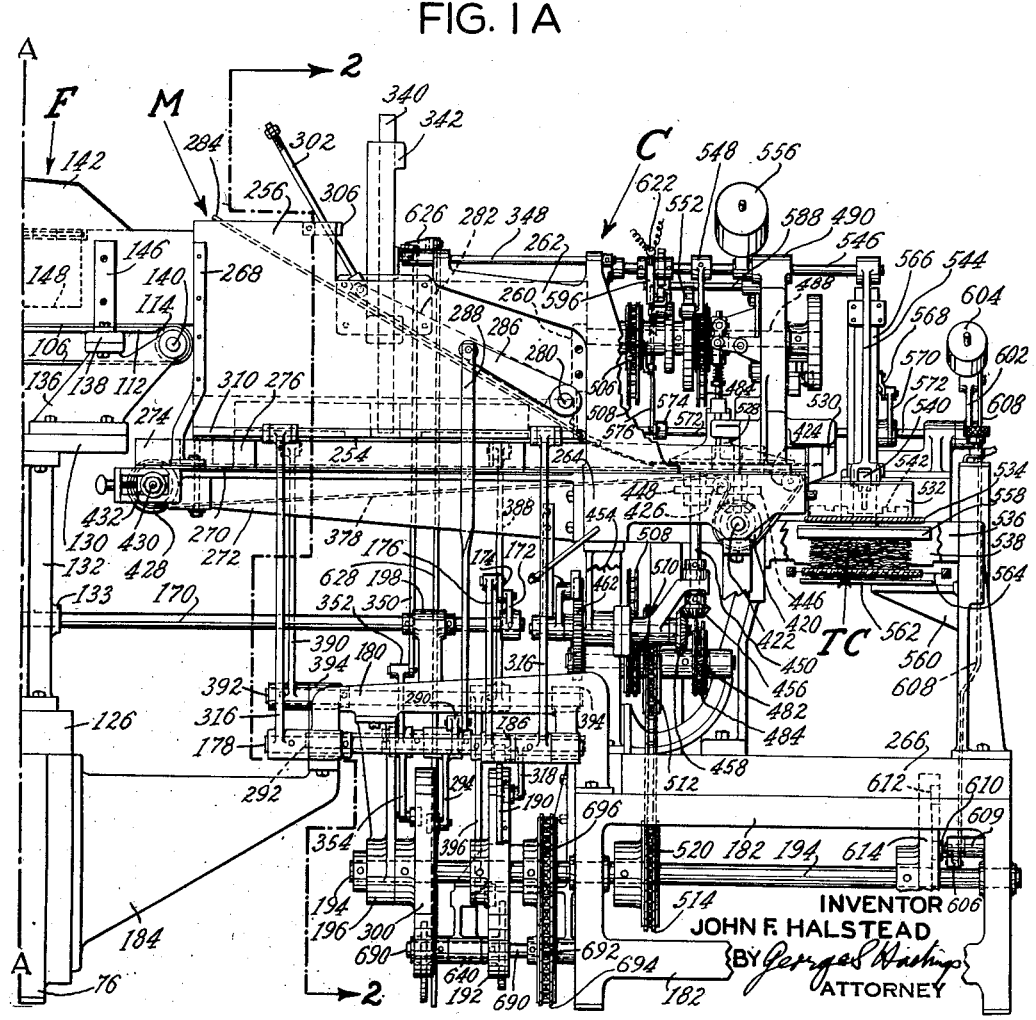

The stream of filler tobacco compacted by compressor foot 528 is advanced onto a platform 532 also described in said patent, and after severance of a bunch length by cutter 530, swings into the downwardly inclined position shown in Fig. 1A where it comes to rest on a horizontal gate 534 (Fig. 1A). The latter projects over a space between vertical plates 536 and 538, and a swinging rake 540 having a pusher plate 542 delivers the severed bunch length to the gate 534 while the latter covers the space between plates 536 and 538. The plates 536 and 538 form the side walls of a filler supply magazine of the type disclosed in my Patent No. 2,255,054 dated September 9, 1941. The rake 540 is pivotally connected to and actuated by an arm 544 (Fig. 1A) mounted on a shaft 546 supported in suitable bearing lugs of bracket 490. Shaft 546 is actuated by means of a cam lever 548 carrying a cam roller 550 (Figs. 1A, 25 and 26) engaging with a cam 552 mounted on shaft 488. To shaft 546 is also secured an arm 554 supporting a weight 556 which tends to hold roller 550 in engagement with cam 552 whereby swinging motion is imparted to rake 540 to advance the bunch length on to the gate 534. Further description of the construction of the platform 532 and the rake 540 is deemed unnecessary as reference may be had to my prior Patent 2,255,054 for complete disclosure of the details thereof.

With the filler section or severed bunch length in position on gate 534 of the filler magazine, a pressure plate 558 and its integral resilient pad descends and bears against the filler section resting on said gate. Simultaneously, an elevator 560 and the entire filler supply is lowered into position for the separation of a thin charge from the bottom of the tobacco column by a knife blade 564. Inasmuch as the construction and movement of the elevator 560 and knife 564 is the same as described in my above mentioned Patent 2,255,054 a more detailed description of the same is deemed unnecessary.

In order to provide means for stopping the cross feed in case the tobacco column TC is too high, that is, too much tobacco has accumulated in the filler magazine, the guide plunger 566, which supports the pressure plate 558 (Fig. 1A) is connected by a link 568 to an arm 570 mounted on a horizontal shaft 572. The latter carries another arm 574 (Figs. 1A, 2, 25 and 26) which by means of a link 576 is connected to a control lever 578, a stud 580 on lever 578 engaging with a slot 582 of link 576. Control lever 578 is loosely mounted on stud 588 and provided with a member 584 carrying a step plate 586 whose lower edge normally engages with a latch arm 590 loosely mounted on shaft 546 between a pair of collars 592. The engagement of member 584 and latch arm 590 is normally maintained by a spring 594 (Figs. 2 and 26). A resetting arm 596 which may be integral with latch arm 590 is provided to be engaged by a roller 598 pivoted to a rotating arm 600 extending from the hub 504 of sprocket 506.

To the shaft 572 is secured still another arm 602 (Figs. 1A and 2) which carries a weight 604 acting through pressure plate 558 upon the tobacco column TC in the filler magazine except when lifted to permit a new bunch length to be added to the top of the said column. The lifting is accomplished by a cam lever 606, which through a link 608 is connected to arm 602. The link 608 has lost motion connection to arm 602 similar to the pin and slot connection 36 of the link 37 and weighted arm 31 shown in my Patent 2,255,504. Thus, the pressure plate 558 will descend to any level at which the top of column TC may be.

Cam lever 606 carries a cam roller 610 engaging with a suitable cam track 612 (Fig. 1A) of a cam 614 mounted on the main cam shaft 194. Cam lever 606 is pivoted to a stud 607 (Fig. 2A) held by a suitable hub 609 (Fig. 1A) extending from frame 182. As the filler supply in the magazine dwindles the pressure plate 558 is caused to descend deeper and deeper into the magazine by the action of the weighted arm 602 and the shaft 572 will be turned and the link 576 depressed to bring the upper end of its elongated slot 582 into engagement with stud 580. Thus, the control lever 578 will be forced downward to effect a disengagement of latch arm 590 from the lower edge of step plate 586, and spring 594 causes latch arm 590 to be pulled against a shoulder on member 584 (Fig. 26). In order to prevent the latch arm 590 from snapping over the shoulder of member 584 in case the control lever 578 is accidentally depressed by hand, a stop finger 591 (Fig. 26) secured to one side of said latch arm will contact a pin 585 held by and protruding transversely from member 584. This movement of latch arm 590 is sufficient to raise its lower edge 616 out of the path of a roller 618 pivoted on an extension 620 of the arm 496 revolving with arm 502 of sprocket hub 504. Upon continued rotation of said hub 504, the roller 598 on arm 600 also revolving with the same contacts the resetting arm 596 and raises the same. The lifting of said resetting arm causes a downward movement of latch arm 590 and the action of spring 594 effects a re-engagement of latch arm 590 with the lower edge of step plate 586 of member 594.

If there is sufficient tobacco in the filler magazine at the beginning of the next cycle the pressure plate 558 does not descend enough to cause a sufficient downward movement of link 576 to actuate control lever 578, and member 584 and latch arm 590 remain in engagement. During the engagement position of latch arm 590 the lower edge 616 is located in the path of the roller 618 and the contact of the latter with said edge causes a depression of the extension 620 of arm 496 and effects a disengagement of the latter from the tooth 494 of the clutch disc 492 which arrests the driving means of the cross feed until arm 496 again engages with tooth 494 during one of the subsequent cycles of the machine. Tension spring 501 which is anchored to arm 502 and connected to arm 496 causes the latter to ride on the rim of clutch disc 492 after disengagement from tooth 494, but effects a re-engagement if extension 620 is not depressed again at the next cycle.

Since the control for the operation of automatic feed drums D and DA necessitates a control of the electrical current supplied to the gear reduction motor unit 70 which drives said feed drums, the machine is provided with several suitable switches all of which must be closed to effect the running of said motor. If there is sufficient tobacco in the filler magazine and the cross feed is stopped as just mentioned above, the automatic feed drums must also be stopped. For this reason, a mercury switch 622 of well known construction is attached to a suitable bracket 624 which is secured to the top edge of the reset lever 596 and when member 584 and latch arm 590 are in engagement said mercury switch is in "open" position and causes an interruption of the current supplied to motor 70, and thereby terminates the rotation of feed drums D and DA.

In order to keep the quantity of tobacco fed by the feed drums in step with the requirements of the cross feed C the machine is provided with a novel control device which is illustrated in Figs. 2A, 21, 22, 23 and 24. Since the position of plunger P when resting on the level of the tobacco in the cross feed channel K is the best indicator of how much tobacco is in said channel, the plunger operating lever 346 is provided with an extension 626 (Figs. 1A, 2, 2A and 10) the free end of which carries a link 628 the lower end of which is provided with an elongated slot 630 which engages with pin 632 mounted on an arm 634 extending from the hub 636 of a ball crank lever 642 fulcrumed on a stud 638 held by a bracket 640 fastened on the side of frame 182.

On its upper end, lever 642 carries a stud 644 which engages with a slot 646 of a horizontal cam bar 648 slidably supported by studs 650 and 652 engaging with slots 654 and 656, respectively, formed in the bar 648. Stud 650 is held by a suitable angle bracket 658 mounted on bed plate 266 and stud 652 projects from another slidably mounted cam bar 668 (see Figs. 21 to 24) alongside cam bar 648 and supported by means of stud 650 and another stud 670 which is held by a suitable angle bracket 672 also mounted on bed plate 266. Cam bar 668 is provided with slots similar to those of bar 648 by which bar 668 is supported upon studs 650 and 670. Cam bar 668 is connected by a link 674 to an operating arm 676 mounted on a shaft 678 supported by a suitable bearing lug 680 of bracket 640 and a bearing bracket 682 secured to bracket 640.

To shaft 678 (Fig. 21) is furthermore secured a cam lever 684 carrying a cam roller 686 engaging with a cam 688 mounted on a shaft 690. Roller 686 is held in engagement with cam 688 by means of a tension spring 687 (Fig. 2A). Shaft 690 carries a sprocket 692 which through a chain 694 is continuously driven from a sprocket 696 (Fig. 2A) mounted on the main cam shaft 194. Cam bars 648 and 668 are slidably connected by a spring plate 698 which is secured at one end to the lower edge of bar 648 and formed at its free end into a tooth 700 projecting into one of the numerous teeth 702 with which the lower edge of cam bar 668 is provided. The upper edges of both bars 648 and 668 are provided with cut-outs 704 and 706, respectively, and a roller 708 pivoted to a switch operating arm 710 contacts and extends across the upper edges of both bars.

Arm 710 is the operating means for a "Mercoid" switch of well known construction sealed in a housing 712 attached to cross bars 714 secured to brackets 658 and 672. Said switch is so arranged that it interrupts the current when roller 708 is in contact with the high portion of the upper edges of bars 648 and 668, but as soon as said roller drops into the cut-outs 704 and 706 a contact is made and current is supplied to the gear reduction motor unit 70, to drive the feed drums D and DA provided all other switches are also closed. The two bars 648 and 668, in conjunction, control the length of time the feed drums will run and consequently the amount of tobacco delivered by the same.

The operation of the control is as follows: At the beginning of the cycle the bar 648 is at its innermost position and the bar 668 is at its outermost position, the roller 708 resting on the high portions of the upper edges of the outer portion of bar 648 and inner portion of bar 668. When there is no filler tobacco in the filler feed channel K the plunger P, which is free to move downwardly therein due to the lost motion connection of link 350 to cam lever 352, displaces the link 628 sufficiently to engage the upper end of its slot 630 with the pin 632 on the arm 634 of the bell crank lever 642 and thereby displace the bar 648 outwardly to the position shown in Fig. 2A. Therefore, the bar 648 is set to produce a maximum feeding of the tobacco by the feed drums. If the channel K is partially filled, the bar 648 is not displaced as far outwardly. In either case, both bars 668 and 648 are then moved inwardly by cam lever 676 and roller 708 drops into the cut-outs 706 and 704 and thereby closes the switch in housing 712 and effects the starting of the feed drums D and DA. Upon further movement of bars 668 and 648 inwardly the roller 708 comes to the end of one of the cut-outs 704 and 706 in accordance with the setting of the bars, and rolls up to the high portion of the upper edge of the respective bar.

Thus, the opening of the switch 712 and the stopping of the feed drums D and DA results. Upon continued rotation of cam 688, which through cam lever 684 and arm 676 operates bar 668, the latter is pushed outwardly to its original starting position, but bar 648 which followed bar 668 during its inward motion due to the connection of spring plate 698 with teeth 702, is now arrested by the high portion of a cam 716 contacting a roller 718 pivoted to arm 634 of bell crank 642. Therefore, during the outward motion of bar 648, the teeth 702 of cam bar 668 simply ride over the tooth of spring plate 698 on the arrested cam bar 648. Cam 716 is mounted on the shaft 690 and, of course, turns with the same.

The machine is so timed that as soon as the high portion of cam 716 has lost contact with the roller 718, the plunger P descends and causes the upper end of slot 630 of link 628 to engage with the stud 632, thereby pressing arm 634 downwardly through an extent determined by the thickness of the tobacco stream in the feed channel K contacted by the plunger P. The downward movement of arm 634 so created causes an outward movement of the cam bar 648 for a distance sufficient to bring the end of its cut-out 704 to a position opposite cut-out 706 to feed sufficient tobacco to bring the level of the tobacco in the feed channel K to the desired thickness during the next cycle of the machine. In case the level of the tobacco in the feed channel K has reached a certain height the end of slot 630 cannot descend sufficiently to contact the pin 632 and lever 642 is not moved and cam bar 648 remains in its inner position. Therefore, the high portion of the upper edge of bar 648 will not permit the roller 708 to drop into the cut-out 706 of bar 668 and the switch 712 will remain open during the cycle and stop the feed drums D and DA.

Figure 27:
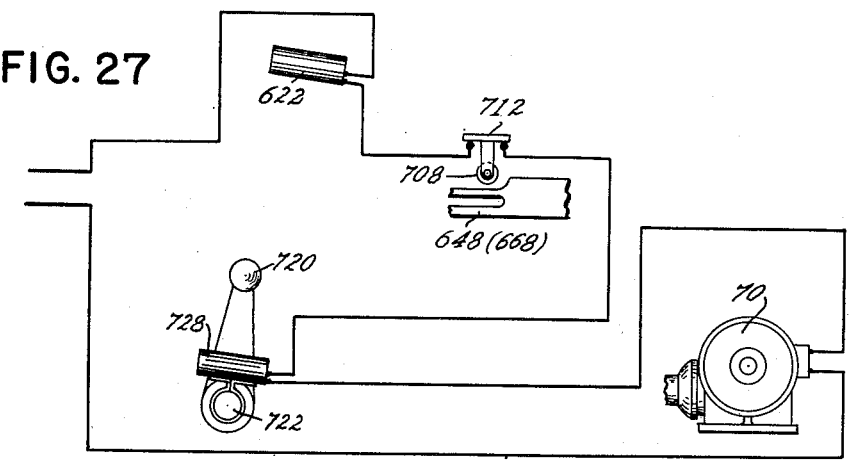
Fig. 27 is a wiring diagram illustrating the electrical connections effecting the automatic control of the tobacco feed.

The cigar machine is furthermore provided with a hand lever 720 (Fig. 2A) by means of which the operator can start and stop said machine. Said hand lever is mounted on a shaft 722 which actuates an arm 724 which by means of a suitable link 726 is connected to the main clutch (not shown) of the machine. To prevent the feed drums from continuing their rotation in case the cigar machine is stopped in the middle of a cycle, the shaft 722 carries a mercury switch 728 which interrupts the current supplied to motor 70 as soon as hand lever 720 is moved towards the right in Fig. 2A. Two stop pins 730 held by a suitable bracket 732 mounted on bed plate 266 limit the movement of hand lever 720. The wiring diagram disclosed in Fig. 27 illustrates the electrical connection between all switches and the motor 70 driving the feed drums.

I claim:

1. In a cigar machine, the combination with a filler feed operating to intermittently advance a continuous layer of leaf tobacco, of means for removing tobacco leaves from a bulk supply of leaf tobacco haphazardly arranged in a supply holder, while a first conveyor is advancing the tobacco layer and delivering them in overlapped shingled relationship to said filler feed and while said filler feed is stationary to form a continuous layer of leaf tobacco on the filler feed, and mechanism for determining the thickness of the layer of tobacco on the portion of the filler feed on which tobacco is to be deposited by said means, and automatically varying the quantity of tobacco leaves delivered to said portion of said filler feed by said means to obtain a tobacco layer of approximately constant thickness on said portion of said filler feed.

2. In a cigar machine, the combination with a filler feed adapted to advance a continuous layer of filler tobacco, of means for removing individual tobacco leaves one by one from a bulk supply of leaf tobacco haphazardly arranged and delivering them to said filler feed with their lengths extending in the direction in which the tobacco is advanced on the filler feed to form a continuous layer of filler tobacco on said filler feed, and mechanism for determining the thickness of the layer of tobacco on the filler feed and stopping said means in case the thickness of said layer is too great.

3. In a cigar machine, the combination with means for advancing a continuous layer of filler tobacco, of mechanism for removing tobacco leaves from a bulk source of leaf tobacco haphazardly arranged in a supply holder and delivering the tobacco leaves to said means to form a continuous layer of filler tobacco thereon, a device for determining the thickness of said layer and automatically increasing or decreasing the quantity of tobacco delivered to said means by said mechanism to maintain the thickness of said layer approximately constant, instrumentalities for separating bunch lengths from said layer and assembling them to form a column of tobacco from which bunch charges may be separated, and a device for stopping said means and mechanism when there is an oversupply of tobacco in said column.

4. In a cigar machine, the combination with means for removing tobacco leaves individually from a bulk supply of leaf tobacco haphazardly arranged, of a conveyor adapted to advance a continuous layer of tobacco by increments corresponding to the desired length of the sections to be severed from the leading end of said layer, mechanism arranged to receive individual tobacco leaves one by one from said means and assemble each individual leaf in overlapping shingled formation with the other tobacco leaves assembled therewith, and a device adapted to deliver the leaves assembled by said mechanism upon said conveyor in overlapping shingled relationship to form a continuous tobacco layer on said conveyor.

5. The combination with a conveyor adapted to advance tobacco leaves, of means for removing tobacco leaves individually from a bulk supply of leaf tobacco haphazardly arranged and a device arranged to receive tobacco leaves from said means and deliver individual leaves endwise to said conveyor, and means for driving said conveyor at a speed which will cause said leaves to assume positions extending lengthwise of said conveyor and straighten the leaves into an outspread condition.

6. In a cigar machine, the combination with a conveyor adapted to advance a continuous layer of filler tobacco, of means for removing tobacco leaves from a bulk supply of leaf tobacco and delivering them endwise to said conveyor to form a continuous layer of tobacco thereon, and means for driving said conveyor at a speed which will cause said leaves to assume positions extending lengthwise of said conveyor, said means including a revolving drum adapted to contain a bulk supply of leaf tobacco and provided with a series of perforated internal cups, means for applying suction to each cup as it passes under the bottom of the tobacco supply to cause adhesion of a tobacco leaf thereon, and interrupting the suction as each cup reaches its uppermost position to permit the adhering tobacco leaf to drop from the cup, and an inclined chute having its upper end underlying the uppermost cup and its lower end extending above said conveyor whereby tobacco leaves will be dropped onto the upper end of said chute and will slide down the same on to said conveyor and assume positions extending lengthwise thereof.

7. The combination with a traveling endless belt, of a pair of members having vertical surfaces arranged at either side of said belt, a device for delivering tobacco leaves between said members and upon said belt, and means for driving said belt at a speed sufficient to cause the leaves delivered thereon by said device to assume positions extending lengthwise of the belt, and a magazine having a horizontal bottom located adjacent and below the delivery end of said belt whereby the leaves will be assembled in a row with their lengths extending lengthwise of said magazine and their ends overlapping one another.

8. In a cigar machine, the combination with a filler feed arranged to advance a continuous layer of filler tobacco, of means for removing leaf tobacco from a plurality of bulk supply holders of leaf tobacco, each of said holders having a different type of tobacco haphazardly arranged therein and depositing them upon said filler feed to form a continuous blended layer of tobacco thereon, and mechanism for separating sections from the blended tobacco layer advanced by said filler feed.

9. The combination with a filler feed arranged to advance a continuous layer of filler tobacco, of means for removing leaf tobacco from a plurality of bulk supply holders of leaf tobacco of different types haphazardly arranged and depositing them upon said filler feed to form a continuous blended layer of tobacco, thereon, and mechanism for separating cigar bunch length sections from the leading end of said blended tobacco layer, said means including devices for positioning the tobacco leaves on said filler feed with their lengths extending in the direction of travel of said filler feed.

10. The combination with a conveyor arranged to advance leaf tobacco, of means for removing tobacco leaves from a plurality of bulk supply holders of leaf tobacco of different types haphazardly arranged and depositing them upon said conveyor whereby a blended layer of tobacco will be formed, and a device for determining the thickness of said blended layer and automatically varying the quantity of tobacco delivered by said means to maintain the thickness of said blended layer approximately constant.

11. The combination with a magazine, of mechanism for delivering individual tobacco leaves endwise to said magazine to form a shingled layer of tobacco in said magazine, wherein the tobacco leaves extend lengthwise of the magazine from one end to the other and of said magazine, a filler feed channel consisting of an endless belt having a horizontal upper run and endless belts having vertical runs extending along said horizontal run, said channel being arranged alongside said magazine, and said magazine being coextensive with the major portion of the length of said channel, and means for delivering the layers of tobacco formed in said magazine transversely and vertically to said channel in shingled relationship to form a continuous layer of tobacco in said channel wherein the tobacco leaves extend lengthwise of said channel.

12. The combination with a magazine, of mechanism for delivering tobacco leaves to said magazine to form a layer of tobacco in said magazine, a filler feed channel consisting of an endless belt having a horizontal upper run and endless belts having vertical runs extending along said horizontal run, said channel being arranged alongside said magazine, and means for delivering the layer of tobacco formed in said magazine to said channel, said means including a pusher movable transversely of said magazine, a bridge plate aligned with the bottom of said magazine and extending across said channel into the proximity of said magazine whereby the charge will be delivered on said plate by said pusher, a device for withdrawing said plate to permit the tobacco delivered thereon to fall into the filler feed channel, and a member for pressing the layer of tobacco downwardly into the filler feed channel.

13. The combination with a filler feed channel, of means for longitudinally pleating a horizontal layer of whole tobacco leaves to a width less than the width of the filler feed channel, and a device for delivering the pleated layer transversely and vertically to said channel.

14. The combination with a continuously traveling endless belt adapted to advance a layer of tobacco leaves, of means for delivering tobacco leaves to said belt, a magazine arranged to receive tobacco leaves from said belt, said magazine having a hinged cover movable into an upwardly inclined position while the tobacco leaves are being delivered to said magazine, a device for swinging said cover downwardly to a position below said belt after the magazine is filled with tobacco, and a member movable into a position overlying said belt while said cover is swung downwardly to prevent delivery of leaf tobacco on top of the cover while said cover is swung downwardly by said device.

15. In a cigar machine, the combination with mechanical means for separating tobacco leaves individually from a bulk tobacco supply holder in which tobacco leaves are haphazardly arranged and assembling them to form a shingled layer of leaf tobacco wherein the leaves are longitudinally aligned and overlapped at their ends, of a traveling conveyor adapted to advance a continuous layer of tobacco, mechanism for depositing in overlapped relationship upon said conveyor the shingled layers of tobacco formed by said means with the tobacco leaves extending lengthwise of the conveyor to form a continuous layer of tobacco upon said conveyor, and devices for separating bunch lengths from the layer of tobacco on said conveyor and assembling the separated lengths to form a column of tobacco from which bunch charges are separated.

16. In a cigar machine, the combination with mechanical means for forming a shingled layer of longitudinally aligned tobacco leaves from a bulk supply in which leaves are haphazardly arranged of a traveling conveyor adapted to advance a continuous layer of tobacco, and mechanism for depositing in overlapped relationship upon said conveyor the shingled layers of tobacco formed by said means with the tobacco leaves extending lengthwise of said conveyor to form a continuous layer of tobacco upon said conveyor, devices for separating bunch lengths from said layer and superimposing the separated lengths to form a vertical column of tobacco from which bunch charges are separated, and a knife for separating bunch charges from said tobacco column.

17. In a cigar machine, the combination with a conveyor adapted to advance a continuous layer of tobacco, of mechanical means for removing tobacco leaves from a bulk supply of leaf tobacco in which the leaves are haphazardly arranged and assembling them upon said conveyor to form a continuous layer of tobacco thereon, mechanism for removing sections from the leading end of said layer as it is advanced by said conveyor and then assembling the separated sections in superimposed relationship and compacting the superimposed sections to form a vertical column of tobacco from which bunch charges are separated, and a knife for separating bunch charges from the compacted column.

18. The combination with a filler feed channel consisting of a series of endless traveling belts, one of said belts having an upper horizontal run and a pair of opposed vertical belts having inner vertical runs defining with said horizontal run the filler feed channel, of mechanism for depositing leaf tobacco in said channel to form a layer of tobacco therein, said mechanism comprising a member covering a portion of said filler feed channel, an instrumentality to position oriented leaf tobacco on said member, and means for withdrawing said member from beneath said oriented leaf tobacco to permit said mechanism to deposit said oriented leaf tobacco in said filler feed channel.

19. The combination with a filler feed channel consisting of a series of endless traveling belts, one of said belts having an upper horizontal run and a pair of opposed vertical belts having inner vertical runs defining with said horizontal run the filler feed channel, of mechanism for depositing leaf tobacco in said channel to form a layer of tobacco therein, a member covering a portion of said filler feed channel, and means for withdrawing said member to permit said mechanism to deposit leaf tobacco in said filler feed channel, said means including a device for withdrawing said member horizontally from its position above said channel and then returning said member in an upwardly inclined position to a position above said channel and then lowering said member to a horizontal position.

20. The combination with a conveyor adapted to advance a continuous shingled layer of tobacco, of a compactor adapted to compress said layer, a reciprocable member on which said compactor is pivotally mounted and lowered into position to compact said layer on said conveyor whereby said compactor will assume a tilted position corresponding to the angular level of the top of said layer while compacting the same, and a device for causing said compactor to tilt back to a horizontal position shortly before the lower edge of the tilted compactor engages the conveyor.

21. The combination with a magazine, of mechanism for delivering tobacco leaves one by one from a bulk tobacco supply holder in which tobacco leaves are haphazardly arranged to said magazine to form a layer of tobacco in said magazine, wherein the tobacco leaves extend lengthwise of the magazine from one end to the other end thereof and are overlapped at their ends, a filler feed channel consisting of an endless belt having a horizontal upper run and endless belts having vertical runs extending along said horizontal run, said channel being arranged alongside said magazine, and means for delivering the layers of tobacco formed in said magazine transversely to said channel to form a continuous tobacco layer wherein the tobacco leaves extend lengthwise of said channel, the length of said magazine being coextensive with the major portion of the length of the filler feed channel whereby a shingled layer of leaf tobacco having a length equal to the major portion of the length of the channel will be assembled in said magazine before being deposited in said channel.

22. The combination with a filler feed arranged to advance a continuous layer of tobacco, of means for removing leaf tobacco from a bulk supply holder in which tobacco leaves are haphazardly arranged and depositing it upon said filler feed, and mechanism for removing blending tobacco from an auxiliary bulk supply of tobacco and depositing the blending tobacco upon the filler feed whereby a continuous layer of blended tobacco will be formed on the filler feed, said means including a device operating to align the leaf tobacco so that when it is deposited on said filler feed it will extend lengthwise of the direction in which the tobacco is advanced on the filler feed.

23. In a cigar machine, the combination with a conveyor adapted to intermittently advance a continuous stream of leaf tobacco by increments corresponding to the desired length of sections to be separated from the leading end thereof; of means operating to remove tobacco leaves one by one from a bulk supply holder in which tobacco leaves are haphazardly arranged and form a layer of tobacco leaves while said conveyor is advancing said stream of leaf tobacco; instrumentalities operating intermittently to deposit said layers successively in overlapping relationship upon said conveyor, while the latter is stationary, to form thereon a continuous stream of leaf tobacco; a device for determining prior to each cycle of operation of said means the thickness of the tobacco stream on the section of said conveyor; and mechanism controlled by said device for interrupting the operation of said means during its next cycle of operation when the thickness of the tobacco stream on said conveyor is determined by said device to be excessive.

24. In a cigar machine, the combination with a conveyor adapted to intermittently advance a continuous stream of leaf tobacco by increments corresponding to the desired length of sections to be separated from the leading end thereof; of means operating to remove tobacco leaves one by one from a bulk supply holder in which tobacco leaves are haphazardly arranged and form a layer of tobacco leaves while said conveyor is advancing said stream of leaf tobacco; instrumentalities operating intermittently to deposit said layers successively in overlapping relationship upon said conveyor, while the latter is stationary, to form thereon a continuous stream of leaf tobacco; a device for determining prior to each cycle of operation of said means the thickness of the tobacco stream on the section of said conveyor; and mechanism controlled by said device for interrupting the operation of said means during its next cycle of operation when the thickness of the tobacco stream on said conveyor is determined by said device to be excessive, and instrumentalities controlled by said device for varying the duration of the operation of said means in its next cycle of operation, and thereby varying the quantity of tobacco leaves in the layer of leaf tobacco formed by said means, in accordance with variations in the thickness of the tobacco stream on said portion of said conveyor determined by said device whereby a tobacco stream of approximately constant thickness will be formed on said conveyor.

25. A device to feed leaves into the cross feed channel of a cigar machine comprising in combination, a magazine having a bottom arranged to support a layer of tobacco leaves, of a conveyor having a horizontal run arranged to advance and deliver outspread leaves endwise to said magazine with sufficient momentum to cause the leaves to slide along the magazine bottom upon each other in shingled relation, of means for moving said shingled layer sidewise to pleat said layer to a narrow width, a device operative with said means to deliver said narrow pleated layer into the cross feed channel of a cigar machine, said cross feed channel having a width slightly greater than the width of said shingled pleated layer.

26. In a cigar machine, the combination with an intermittent filler feed, of means for depositing tobacco in said filler feed to form a layer of tobacco therein, an electric motor driving said means, an electrical circuit connected to said motor to supply electrical current thereto and thereby operate said motor and said means, a switch in said circuit, said switch having an operating member adapted to be displaced into position to break said circuit and thereby stop said motor and said means, a pair of cam members movable along and contacting said switch operating member and having shaped portions to move said switch operating member into switch breaking position, one of said pair of cam members being driven in timed relation to said machine to permit operation of said motor and said means throughout a predetermined dwell of said intermittent filler feed, the other of said cam members being movable with said first cam member during its motion, a device for determining the thickness of the layer of tobacco deposited in said filler feed by said means, and a mechanism controlled by said device to vary the position of said other cam member relative to said first cam member to vary the operative cycle of said motor and said means permitted by said first named cam members during the combined motion of said cam members, whereby said detecting mechanism may thereby vary the deposit of tobacco by said motor and said means during each cycle to provide a predetermined thickness of layer of tobacco on said filler feed.

27. The method of aligning and arranging tobacco leaves comprising taking individual tobacco leaves one by one from a bulk supply source in which the leaves are haphazardly arranged, moving said leaves longitudinally in one direction at such speed to a point at which they are impelled in transfer with sufficient momentum that they are caused to slide one upon the other in shingled relationship on the floor of a magazine located beneath and beyond the point at which they are impelled.

28. The method of aligning, arranging and blending tobacco leaves comprising taking tobacco leaves one by one from a plurality of bulk supply sources in which the leaves are haphazardly arranged, selectively moving leaves from each of said plurality of sources longitudinally in one direction at such speed to a point at which they are impelled in transfer with sufficient momentum that they are caused to slide one upon the other in blended shingled relationship on the floor of a magazine located beneath and beyond the point at which they are impelled.

(References on following page)

References Cited in the file of this patent

UNITED STATES PATENTS

| | | | |
|---|---|---|---|
| 1,561,856 | Heyman | Nov. 17, | 1925 |
| 1,977,994 | Lindblad | Oct. 23, | 1934 |
| 1,984,811 | Rundell | Dec. 18, | 1934 |
| 2,255,054 | Halstead | Sept. 9, | 1941 |
| 2,276,289 | Clausen | Mar. 17, | 1942 |
| 2,284,472 | Halstead | May 26, | 1942 |
| 2,329,169 | Wheeler | Sept. 7, | 1943 |
| 2,344,769 | Durning | Mar. 21, | 1944 |
| 2,378,921 | Gladeck | June 26, | 1945 |
| 2,603,220 | Durning | July 15, | 1952 |
| 2,625,936 | Rundell | Jan. 20, | 1953 |
| 2,667,171 | Clausen et al. | Jan. 26, | 1954 |

FOREIGN PATENTS

| 506,883 | Great Britain | June 6, 1939 |
|---|---|---|